(12) United States Patent
Goto et al.

(10) Patent No.: US 11,045,961 B2
(45) Date of Patent: Jun. 29, 2021

(54) ROBOT AND ROBOT SYSTEM

(71) Applicant: Seiko Epson Corporation, Tokyo (JP)

(72) Inventors: Yoshinobu Goto, Matsumoto (JP); Takuya Owa, Shen Zhen (CN)

(73) Assignee: Seiko Epson Corporation

( * ) Notice: Subject to any disclaimer, the term of this patent is extended or adjusted under 35 U.S.C. 154(b) by 299 days.

(21) Appl. No.: 16/143,590

(22) Filed: Sep. 27, 2018

(65) Prior Publication Data
US 2019/0099903 A1 Apr. 4, 2019

(30) Foreign Application Priority Data

Sep. 29, 2017 (JP) .............................. JP2017-192174

(51) Int. Cl.
| | |
|---|---|
| *B25J 17/00* | (2006.01) |
| *B25J 17/02* | (2006.01) |
| *B25J 18/00* | (2006.01) |
| *B25J 19/06* | (2006.01) |
| *B25J 9/00* | (2006.01) |
| *B25J 9/16* | (2006.01) |
| *F21V 8/00* | (2006.01) |
| *G08B 5/36* | (2006.01) |

(52) U.S. Cl.
CPC .............. *B25J 19/06* (2013.01); *B25J 9/0009* (2013.01); *B25J 9/161* (2013.01); *G02B 6/0011* (2013.01); *G08B 5/36* (2013.01); *G05B 2219/33198* (2013.01); *G05B 2219/39001* (2013.01)

(58) Field of Classification Search
CPC .......... B25J 19/06; G02B 6/0011; G08B 5/36; G05B 2219/39001
See application file for complete search history.

(56) References Cited

U.S. PATENT DOCUMENTS

| | | | | |
|---|---|---|---|---|
| 5,712,552 | A  * | 1/1998 | Hirai | B25J 19/0029 |
| | | | | 318/568.1 |
| 6,135,702 | A  * | 10/2000 | Huang | B25J 19/06 |
| | | | | 414/729 |
| 2011/0313571 | A1* | 12/2011 | Hashimoto | B25J 19/06 |
| | | | | 700/258 |
| 2018/0040209 | A1* | 2/2018 | Lim | H02S 10/12 |
| 2019/0248030 | A1* | 8/2019 | Matsuda | B25J 19/063 |
| 2019/0250304 | A1* | 8/2019 | Yoon | G01V 8/20 |
| 2020/0230802 | A1* | 7/2020 | Phipps | B25J 1/02 |

FOREIGN PATENT DOCUMENTS

| | | |
|---|---|---|
| JP | 2002-239970 A | 8/2002 |
| JP | 2017-080857 A | 5/2017 |

* cited by examiner

*Primary Examiner* — Jake Cook
(74) *Attorney, Agent, or Firm* — Harness, Dickey & Pierce, P.L.C.

(57) ABSTRACT

A robot includes a robot main body that includes a base and an arm configured to include a first casing and a second casing connected to the first casing, a motor that drives the arm, and a light emitting element that emits light and in which the first casing and the second casing form a first space and a second space isolated from the first space in a state of being connected to each other, the light emitting element is disposed in the first space, and the motor is disposed in the second space.

13 Claims, 18 Drawing Sheets

ROBOT AND ROBOT SYSTEM

BACKGROUND

1. Technical Field

The present invention relates to a robot and a robot system.

2. Related Art

In the related art, an industrial robot that performs various work on a work target instead of a human being is active. As an example of such an industrial robot, for example, a robot including a base, a robot arm provided so as to be rotatable with respect to the base, and a motor provided inside the robot arm and driving the robot arm is known. In general, a controller provided separately from the robot is connected to such a robot. The robot arm is driven by driving the motor with the controller. With this configuration, the robot can perform various work on the work target.

In consideration of safety during driving of the robot, an indication lamp for notifying that the robot can be driven is generally provided in the robot. For example, a robot provided with an indication lamp that is provided in a robot arm and emits light to the outside is disclosed in JP-A-2017-80857. The indication lamp described in JP-A-2017-80857 includes a light emitting element provided inside the robot arm and a light guide plate provided between a housing and a cover that constitute the robot arm, and light from the light emitting element is emitted to the outside through the light guide plate.

However, the indication lamp described in JP-A-2017-80857 has a configuration capable of efficiently emitting light toward the outside by being provided with the light guide plate, but in this configuration, light leaks not only outside the robot but also inside the robot. As a result, there is a problem that visibility of the indication lamp is lowered. Therefore, in the related art, in order to improve visibility, for example, it is necessary to increase the number of light emitting elements or to prepare a high-output light emitting element.

In recent years, for example, a robot in which a packing for sealing is interposed between a housing and a cover that constitute a robot arm so as to exhibit waterproof performance is disclosed (for example, see JP-A-2002-239970). In a case where an indication lamp including a light emitting element or a light guide plate is provided for such a robot, in order to ensure airtightness in the indication lamp, for example, it is necessary to prepare a packing or the like having a complicated shape in consideration of a shape of the indication lamp and the like, and it takes a lot of work for a worker. In addition, there is a problem that it is difficult to assemble so as to maintain airtightness.

SUMMARY

An advantage of some aspects of the invention is to solve at least a part of the problems described above, and the invention can be implemented as the following configurations.

A robot according to an application example includes a robot main body that includes a base and an arm configured to include a first casing and a second casing connected to the first casing, a drive unit that drives the arm, and a light emitting element that emits light, and in which the first casing and the second casing form a first space and a second space isolated from the first space in a state of being connected to each other, the light emitting element is disposed in the first space, and the drive unit is disposed in the second space.

According to such a robot, since the light emitting element is disposed in the first space isolated from the second space where the drive unit is disposed, it is possible to reduce leakage of light emitted from the light emitting element into the robot main body as compared with the case where the drive unit and the light emitting element are disposed in the same space. For that reason, visibility of display using light emitted from the light emitting element can be enhanced.

In the robot according to the application example, it is preferable that a light guide plate that includes an incident surface receiving light emitted from the light emitting element provided in the first space is included, and the light guide plate includes an exposed portion.

With this configuration, the light guide plate is included so as to make it possible to more reliably emit light toward the outside. The light guide plate includes the exposed portion so as to make it possible to improve visibility of display using light emitted from the light emitting element over a wider range.

In the robot according to the application example, it is preferable that the exposed portion is positioned outside the arm than a portion positioned around the exposed portion of the arm.

With this configuration, visibility of display using the light emitted from the light emitting element can be further improved over a wider range.

In the robot according to the application example, it is preferable that the first casing includes a first concave portion and a second concave portion different from the first concave portion, the first concave portion forms the first space, the second concave portion forms the second space in a state where the first casing and the second casing are connected to each other, and a portion forming an opening of the second concave portion of the first casing and the second casing are connected via a first sealing member.

With this configuration, the second space can be airtightly sealed. For that reason, the robot can be used under an environment requiring waterproof performance or dustproof performance.

In the robot according to the application example, it is preferable that the light guide plate is provided between the portion forming the opening of the first concave portion of the first casing, the portion forming the opening of the first concave portion of the first casing and the light guide plate are connected via a second sealing member, and the light emitting element is provided between the first casing and the light guide plate.

With this configuration, it is possible to airtightly seal space (space between the first casing and the light guide plate) where the light emitting element is provided.

In the robot according to the application example, it is preferable that the second casing and the light guide plate are in contact with each other.

With this configuration, it is possible to easily assemble the light guide plate and the second casing.

In the robot according to the application example, it is preferable that a hole for communicating the first concave portion with the second concave portion is provided.

With this configuration, for example, the hole can be used as a wiring hole through which a wiring for supplying power to the light emitting element is inserted.

In the robot according to the application example, it is preferable that the light emitting element is a light emitting diode.

With this configuration, it is possible to realize display with relatively low power consumption and excellent visibility over a long period of time.

In the robot according to the application example, it is preferable that a control board that is provided in the robot main body, a power supply board that is provided in the robot main body and supplies power to the control board, and a drivel board that is provided in the arm and drives the drive unit based on a command from the control board are included.

With this configuration, since the control board having the function of the controller and the power supply board, the drive board, and the robot main body are integrated, the degree of freedom of disposition of the robot can be increased as compared with the case where the robot main body and the controller are separate bodies.

A robot system according to an application example includes a robot that includes a robot main body including a base and an arm configured to include a first casing and a second casing connected to the first casing, a drive unit that drives the arm, and a light emitting element that emits light, and a control device that is provided separately from the robot and includes a control board and a power supply board for supplying power to the control board, and in which the first casing and the second casing form first space and second space isolated from the first space in a state of being connected to each other, the light emitting element is disposed in the first space, and the drive unit is disposed in the second space.

According to such a robot system, the light emitting element is disposed in the first space isolated from the second space in which the drive unit is disposed so as to make it possible to reduce leakage of light emitted from the light emitting element into the robot main body as compared with the case where the drive unit and the light emitting element are disposed in the same space. For that reason, visibility of display using light emitted from the light emitting element can be enhanced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot and a robot system of the invention will be described in detail based on preferred embodiments illustrated in the accompanying drawings.

First Embodiment

Basic Configuration of Robot

Figure 1:
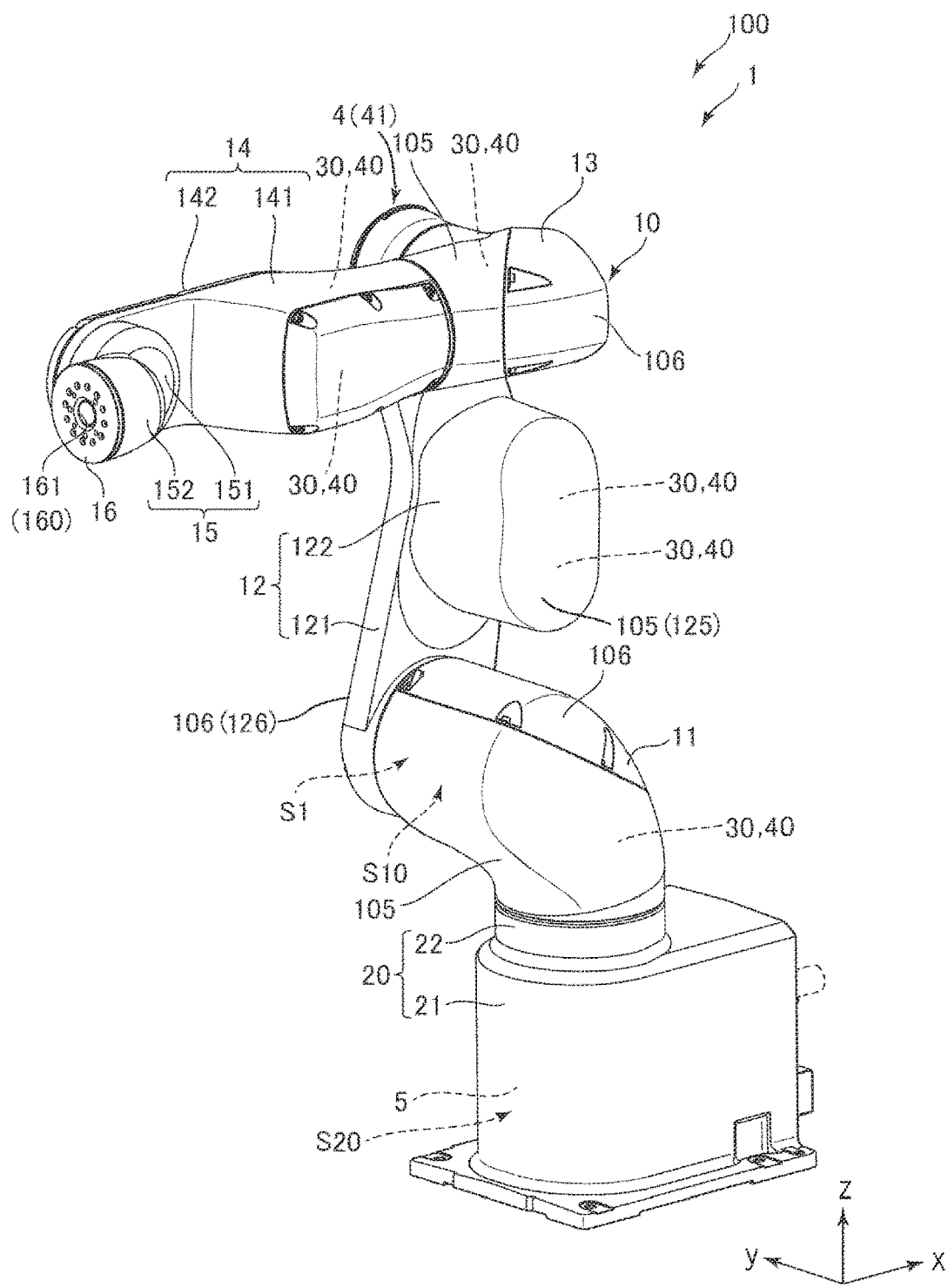
FIG. 1 is a perspective view illustrating a robot according to first embodiment.
Figure 2:
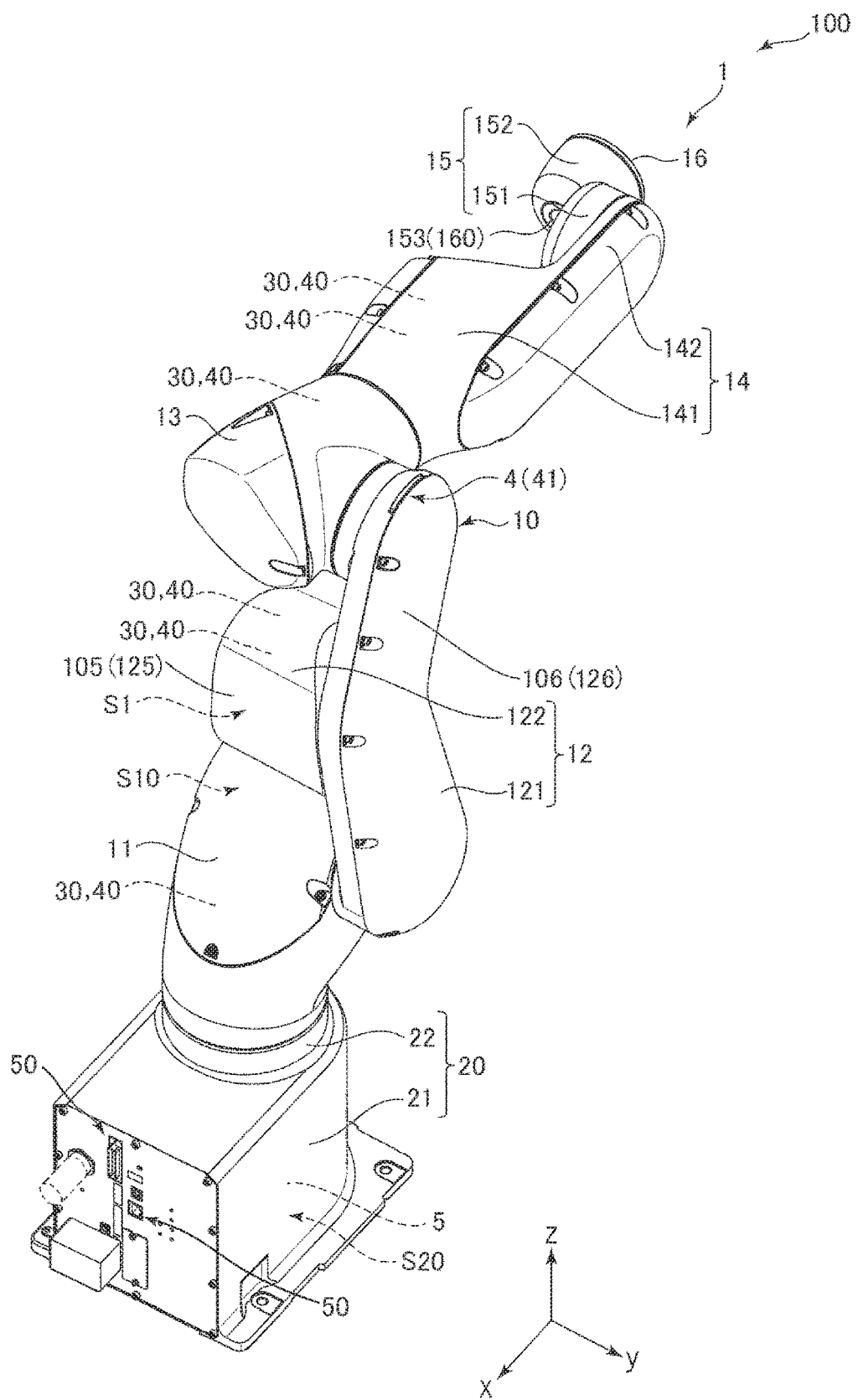
FIG. 2 is a perspective view of the robot illustrated in FIG. 1 as viewed from a direction different from that in FIG. 1.
Figure 3:
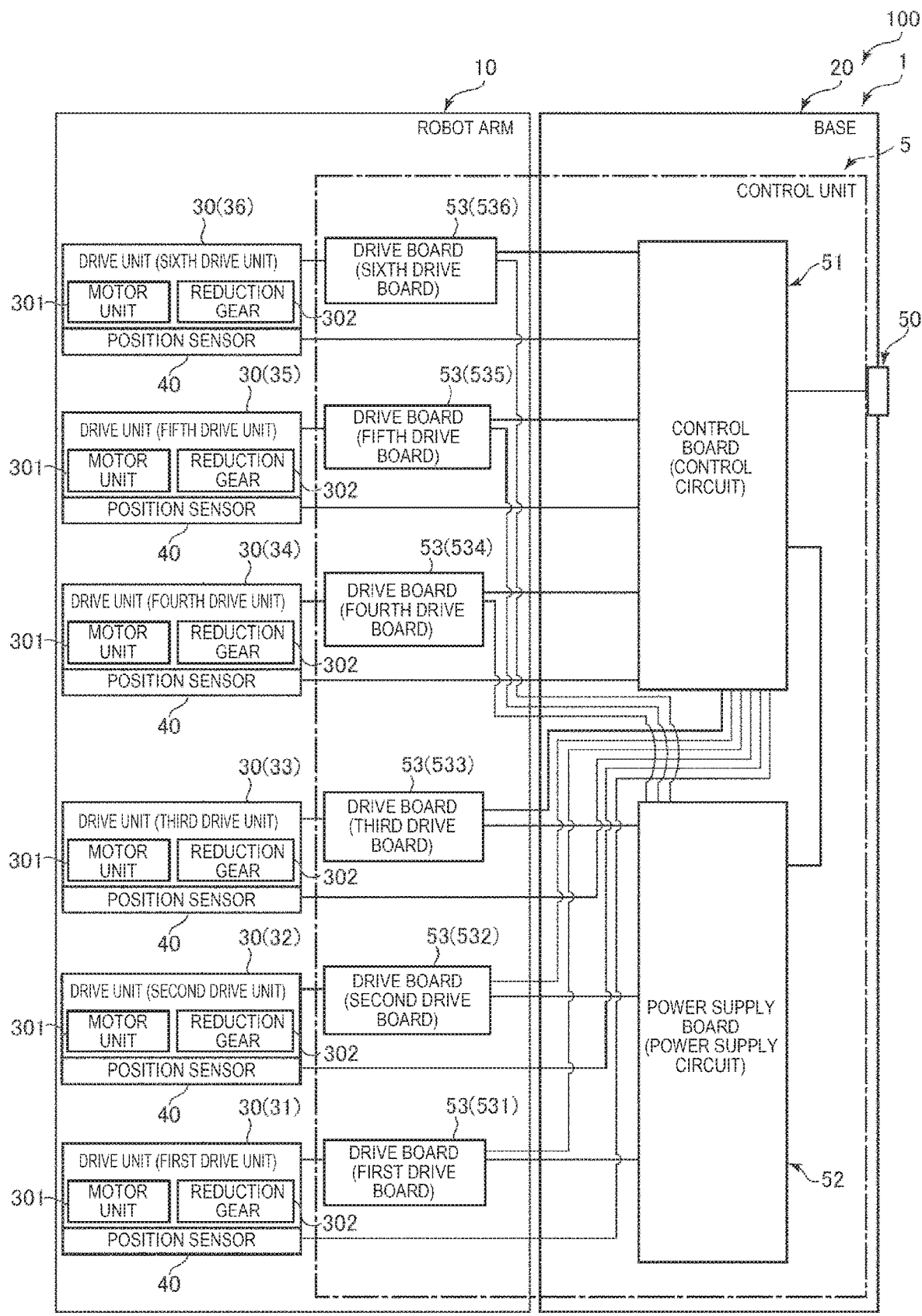
FIG. 3 is a system block diagram of the robot illustrated in FIG. 1.
Figure 4:
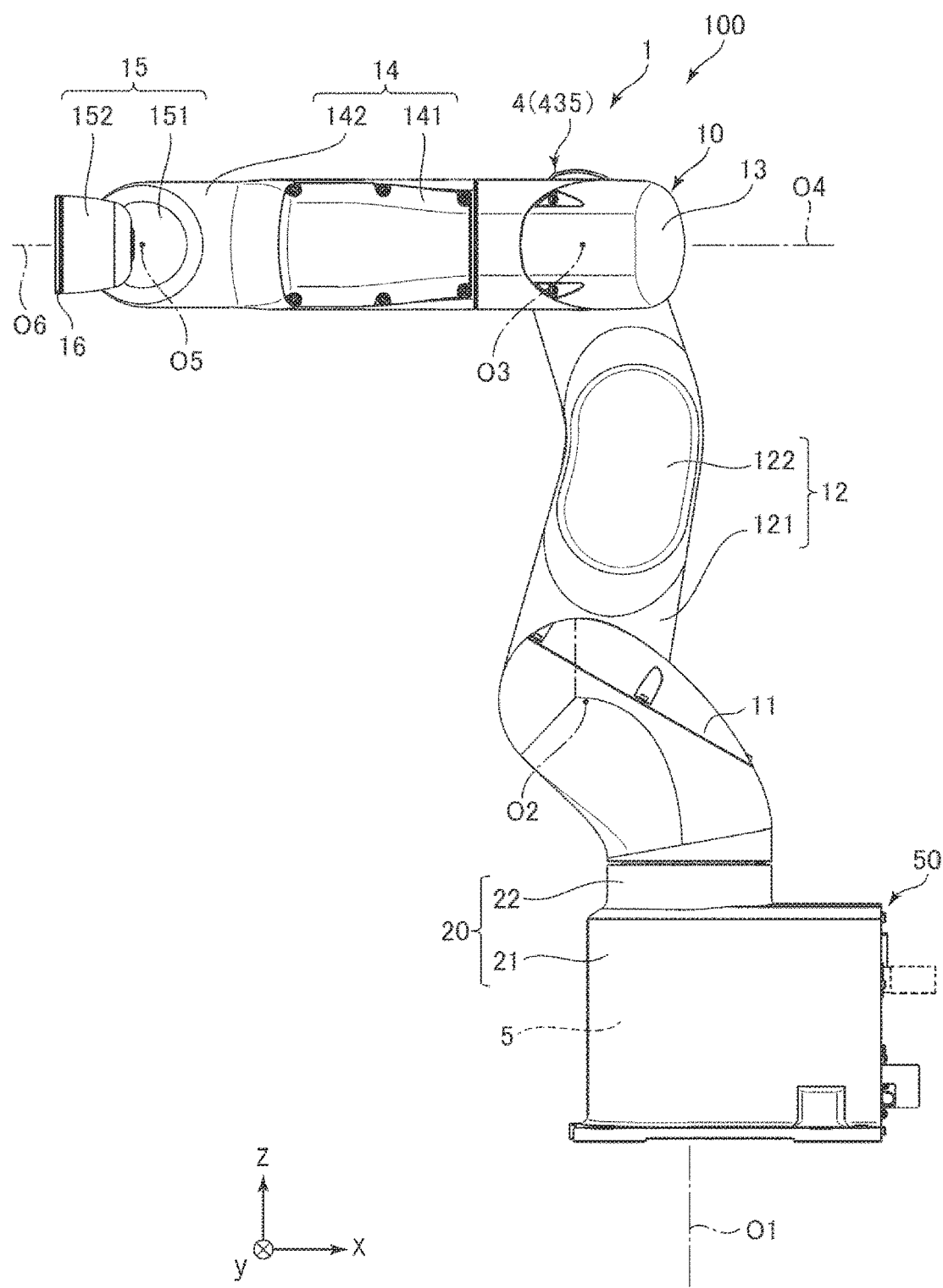
FIG. 4 is a diagram of the robot illustrated in FIG. 1 as viewed from the −y-axis side.
Figure 5:
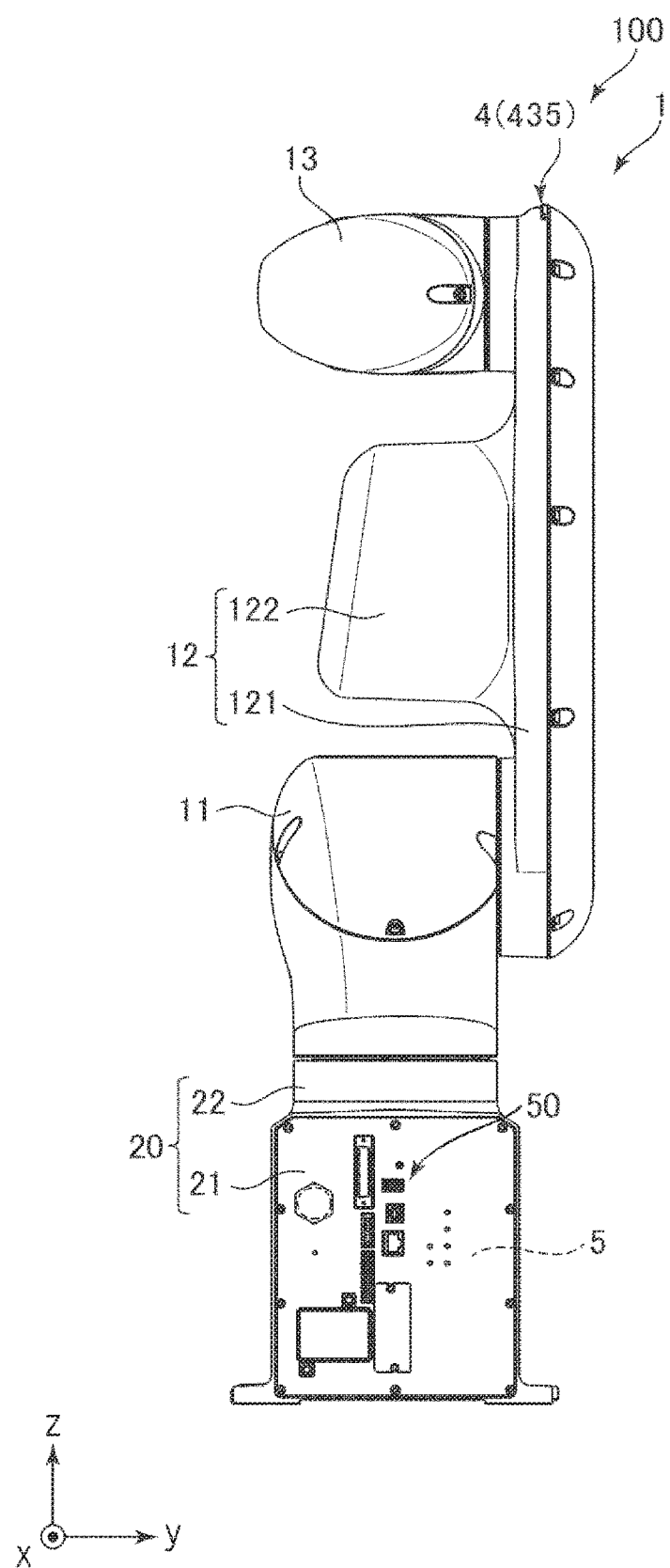
FIG. 5 is a diagram of the robot illustrated in FIG. 1 as viewed from the +x-axis side.
Figure 6:
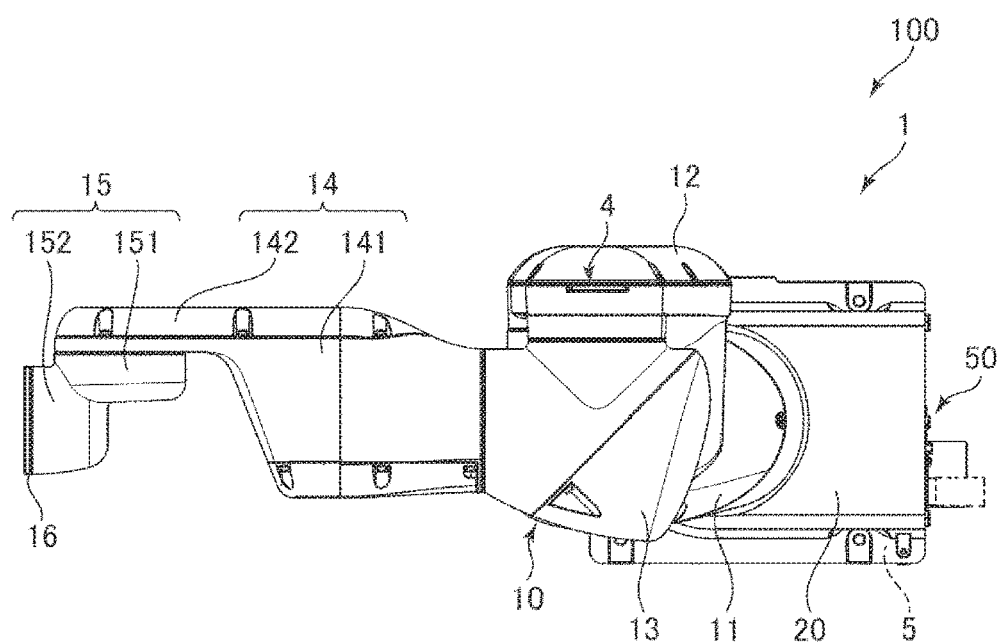
FIG. 6 is a diagram of the robot illustrated in FIG. 1 as viewed from the +z-axis side.
Figure 6:
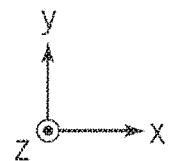
Figure 7:
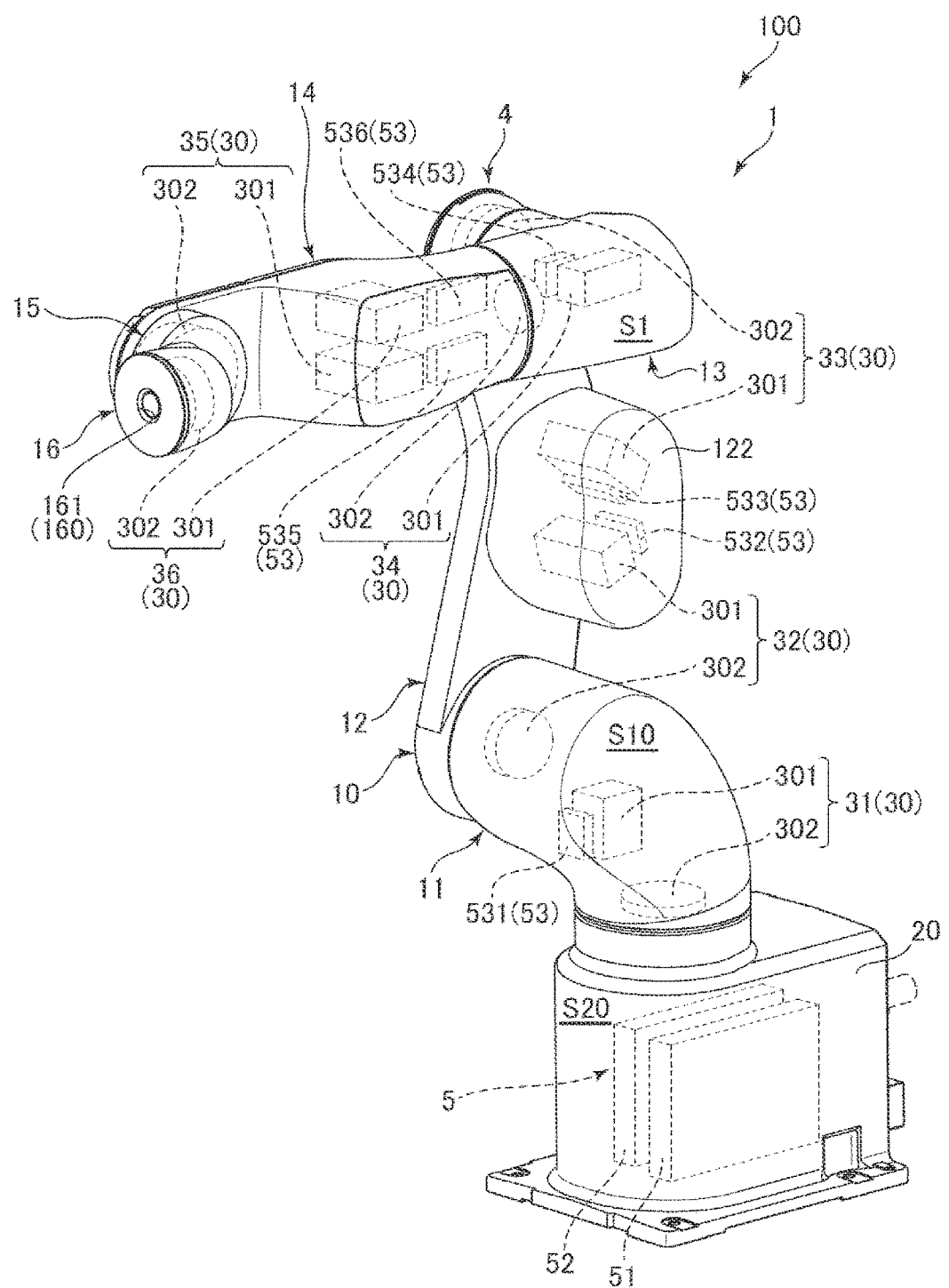
FIG. 7 is a perspective view schematically illustrating the inside of a robot main body included in the robot illustrated in FIG. 1.
Figure 8:
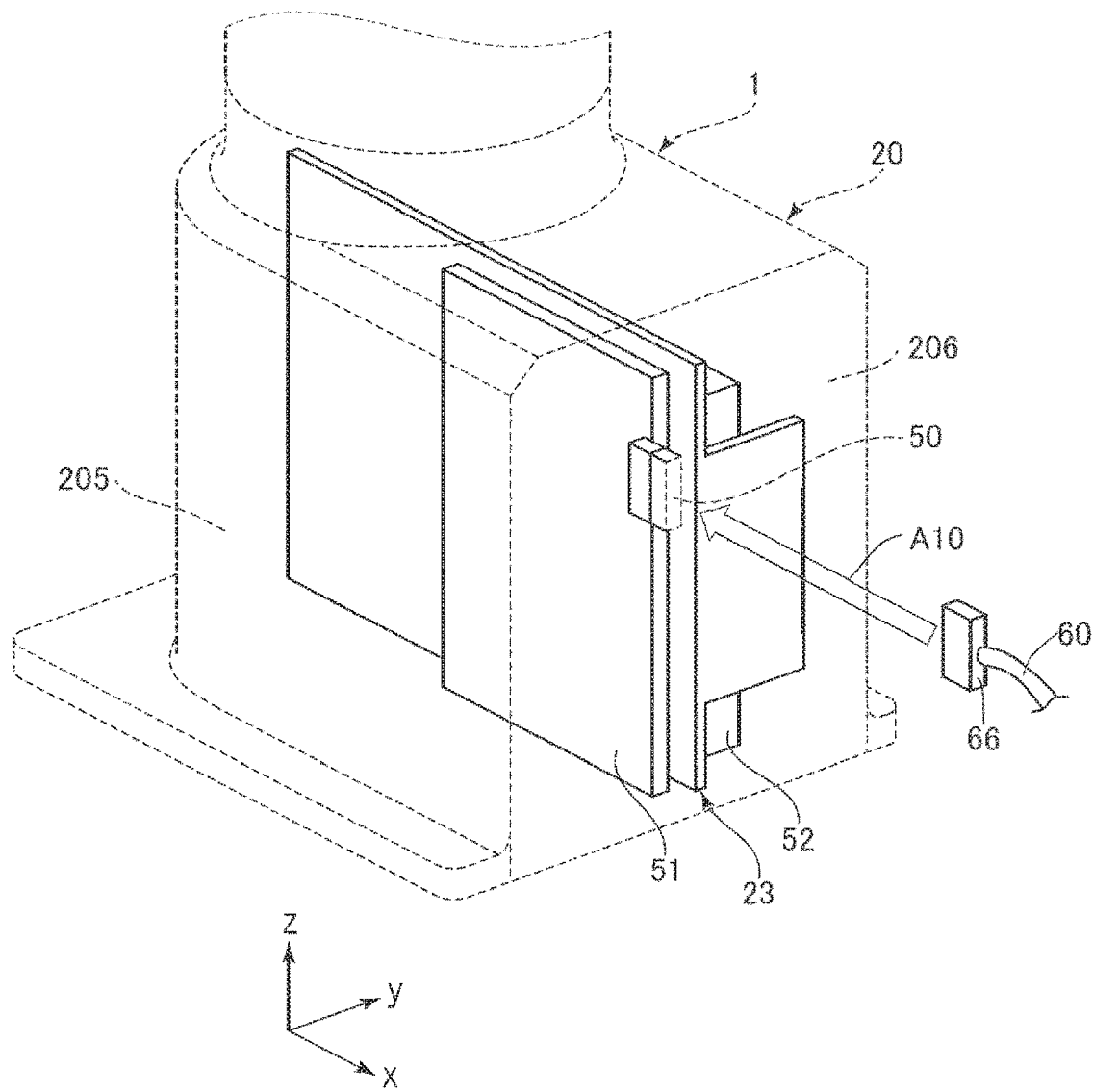
FIG. 8 is a perspective view schematically illustrating the inside of a base included in the robot.

FIG. 1 is a perspective view illustrating a robot according to a first embodiment. FIG. 2 is a perspective view of the robot illustrated in FIG. 1 as viewed from a direction different from that in FIG. 1. FIG. 3 is a system block diagram of the robot illustrated in FIG. 1. FIG. 4 is a diagram of the robot illustrated in FIG. 1 as viewed from the −y-axis side. FIG. 5 is a diagram of the robot illustrated in FIG. 1 as viewed from the +x-axis side. FIG. 6 is a diagram of the robot illustrated in FIG. 1 as viewed from the +z-axis side. FIG. 7 is a perspective view schematically illustrating the inside of a robot main body included in the robot illustrated in FIG. 1. FIG. 8 is a perspective view schematically illustrating the inside of a base of the robot. For convenience of explanation, in each of FIGS. 1, 2, and 4 to 7, x, y, and z axes are illustrated as three axes orthogonal to each other, and the tip end side of the arrow indicating each axis is defined as "+", and the base end side thereof is defined as "−". Also, a direction parallel to the x-axis is referred to as the "x-axis direction", a direction parallel to the y-axis is referred to as the "y-axis direction", and a direction parallel to the z-axis is referred to as "z-axis direction". The base 20 side of a robot 100 illustrated in FIG. 1 is referred to as a "base end", and the opposite side (arm 16 side) is referred to as a "tip end". The upper side in FIG. 4 is referred to as "upper" and the lower side is referred to as "lower". Further, the up-and-down direction in FIG. 4 is defined as the "vertical direction", and the right-and-left direction is defined as the "horizontal direction".

Also, in this specification, the term "horizontal" includes a case where it is inclined within a range of ±5 degrees or less with respect to the horizontal. Similarly, the term "vertical" includes a case where it is inclined within a range of ±5 degrees or less with respect to the vertical. Also, the term "parallel" includes not only a case where two lines (including axes) or planes are perfectly parallel to each other but also a case where two lines (including axes) or planes are inclined within ±5 degrees. The term "orthogonal" includes not only a case where two lines (including axes) or a plane intersects each other at an angle of 90 degrees but also a case where it is inclined within ±5 degrees with respect to 90 degrees.

The robot 100 illustrated in FIGS. 1 and 2 is a so-called six-axis vertical articulated robot. The robot 100 can be used, for example, in a manufacturing process for manufacturing precision instruments such as wristwatches. In particular, the robot 100 has waterproof performance and dustproof performance. For that reason, the robot 100 can be used under an environment requiring waterproof performance or under an environment requiring dustproof performance (for example, a clean room or the like).

In the following, the basic configuration of the robot 100 will be described.

The robot 100 includes a robot main body 1, a plurality of drive units 30, a position sensor 40, and a control unit 5 (control device) built in the robot main body 1 (see FIGS. 1 to 3). The robot 100 includes a plurality of external connection port ions 50 (for example, connectors, and the like). Power is supplied to the robot 100 by electrically connecting, for example, the external connection portion 50 to an external power supply (not illustrated), and with this, the robot 100 can be driven. Further, the robot 100 includes an illumination unit 4 (light emitting unit) having a function as an indication lamp for informing the worker that the robot 100 is in an operable state, for example.

In this specification, the orientation of the robot 100 illustrated in FIG. 1 (same orientation in FIGS. 2 and 4 to 7) is referred to as "basic orientation". In addition, for convenience of explanation, unless otherwise mentioned, in the description on a disposition relationship of the respective portions of the robot 100, description will be made based on the robot 100 in a state of being stationary in the basic orientation.

Robot Main Body

As illustrated in FIGS. 1 and 2, the robot main body 1 includes a base 20 and a robot arm 10 connected to the base 20. As will be described later in detail, the robot main body 1 is configured to include a plurality of exterior members (plurality of housings 105 and a plurality of covers 106, and the like), and includes an internal space S1 accommodating a plurality of drive units 30, a plurality of position sensors 40 and the control unit 5. The internal space S1 includes the inside of the base 20, that is, an internal space S20 and the inside of the robot arm 10, that is, an internal space S10, and the internal space S10 and the internal space S20 are communicated with each other.

In the following, respective portions of the robot main body 1 will be described below.

Base

The base 20 is a portion for attaching the robot 100 to any installation place. The installation place of the base 20 is not particularly limited, and may be, for example, a floor, a wall, a ceiling, a work stand, a movable carriage, and the like. The base 20 includes a main body 21 having a rectangular parallelepiped outer shape and a protruding port ion 22 provided on the +z-axis side of the main body 21 and having a columnar outer shape.

Robot Arm

The robot arm 10 is rotatably supported on the base 20, and includes an arm 11 (first arm), an arm 12 (second arm), an arm 13 (third arm), an arm 14 (fourth arm), an arm 15 (fifth arm), and an arm 16 (sixth arm, tip end arm). These arms 11 to 16 are connected in this order from the base end side to the tip end side, and are configured so as to be rotatable relative to the adjacent base end side arm or base 20. Although not illustrated in detail, in the embodiment, each of the arms 11 to 16 is provided with an exterior member (housing 105, cover 106, and the like), and a support member (not illustrated) provided on the inner peripheral surface of the exterior member and including a bearing (not illustrated) connected to the drive unit 30.

As illustrated in FIG. 4, the arm 11 is connected to the protruding portion 22 of the base 20, and is rotatable around the rotation axis O1 along the vertical direction with respect to the base 20. The arm 11 has a shape extending obliquely upward from the base 20 and the tip end portion of the arm 11 protrudes outward from the base 20 as viewed from the z-axis direction.

As illustrated in FIGS. 4 and 5, the arm 12 is connected to a portion on the +y-axis side of the tip end portion of the arm 11, and is rotatably movable with respect to the arm 11 around a rotation axis O2 along a horizontal direction. The arm 12 has a longitudinal shape in which the central portion is bent as viewed from the y-axis direction, and includes a flat portion 121 having a shape extending from the arm 11 toward the arm 13 and a protruding portion 122 protruding from the central portion of the flat portion 121 toward the −y-axis direction. The protruding portion 122 is separated from the arm 11 so as not to contact the arm 11 even when the arm 12 rotates.

As illustrated in FIGS. 4, 5, and 6, the arm 13 is connected to a surface (portion) on the same −y-axis side as the surface of the flat portion 121 on which the arm 11 is provided and is rotatable around a rotation axis O3 along the horizontal direction with respect to the arm 12. The arm 13 has a shape protruding from the arm 12 in the −y-axis direction. In addition, the arm 13 is connected to the arm 12 so as not to contact the protruding portion 122.

As illustrated in FIG. 4, the arm 14 is connected to the tip end portion of the arm 13 and is rotatable around a rotation axis O4 orthogonal to the rotation axis O3 with respect to the arm 13. As illustrated in FIG. 6, the arm 14 has a shape extending in the -x-axis direction from the arm 13, and the length (width) of the arm 14 in the y-axis direction gradually decreases in the +y-axis direction (one side in the width direction of the arm 14) while orienting from the base end side to the tip end side in the middle. Such an arm 14 includes a base end side portion 141 and a tip end side portion 142 whose length in the y-axis direction is shorter than that of the portion 141.

As illustrated in FIG. 4, the arm 15 is connected to the −y-axis side portion of the tip end side portion 142, and is rotatable around the rotation axis O5 orthogonal to the rotation axis O4 with respect to the arm 14. As illustrated in FIGS. 4 and 6, the arm 15 includes a first portion 151 protruding from the tip end portion of the arm 14 in the −y-axis direction and a second portion 152 connected to the first portion 151. The outer shape of the first portion 151 is a columnar shape. On the other hand, the outer shape of the second portion 152 is cylindrical and has a hole 153 penetrating along the x-axis direction (see FIG. 2). As illustrated in FIG. 6, the portion on the +y-axis side of the center line of the second portion 152 is connected to the base end portion of the first portion 151. In the embodiment, the first portion 151 and the second portion 152 are integrally formed.

As illustrated in FIG. 4, the arm 16 is connected to the base end portion of the arm 15, and is rotatable around the rotation axis O6 orthogonal to the rotation axis O5 with respect to the arm 15. The arm 16 is in the shape of a disk and includes a hole 161 penetrating along the x-axis direction in the center portion thereof (see FIG. 1). The hole 161 communicates with the hole 153 of the second portion 152 of the arm 15, and the hole 161 and the hole 153 constitute a through-hole 160 (see FIGS. 1 and 2). Although not illustrated, such an arm 16 is configured so as to be able to allow attachment of an end effector for performing various work such as gripping, for example, on a work target. In this case, wiring (not illustrated) for transmitting the driving force to the end effector can be inserted through the through-hole 160. For example, the arm 16 may be configured so that a force detection device (force sensor), although not illustrated, for detecting a force (including moment) applied to the end effector can be attached. In this case, it is preferable to provide the force detection device between the end effector and the arm 16.

As described above, the robot 100 including the robot main body 1 having such a configuration is a vertical articulated robot including six (plural) arms 11 to 16. That is, the robot 100 has six rotation axes O1 to O6, and is a robot with six degrees of freedom. For that reason, the driving range of the tip end portion of the robot arm 10 is wide, so that high workability can be exhibited. In the embodiment, the number of arms included in the robot 100 is six, but the number of arms may be one to five, or may be seven or more. However, in order to precisely position the end effector provided at the tip end of the robot arm 10 at the intended place in a three-dimensional space, it is preferable that the number of arms (number of rotation axes) is at least six.

As described above, the arm 12 is connected to a portion on the +y-axis side of the tip end portion of the arm 11. As such, the arm 12 is not configured to be supported at both ends as sandwiched by the arm 11, but is cantilevered by the arm 11. That is, the robot arm 10 includes the arm 11 (A-arm) and the arm 12 (B-arm) is cantilevered by the arm 11 (A-arm).

With this configuration, as compared with a case where the arm 12 is supported at both ends by the arm 11, the configuration of the arms 11, 12 can be simplified and the cost can be reduced.

Furthermore, as described above, the arm 15 is connected to a portion on the −y-axis side of the portion 142. As such, the arm 15 is not configured to be supported at both ends by the arm 14, but is cantilevered by the arm 14. That is, the robot arm 10 includes the arm 14 (A-arm) and the arm 15 (B-arm) is cantilevered by the arm 14 (A-arm).

With this configuration, as compared with the case where the arm 15 is supported at both ends by the arm 14, the configuration of the arms 14, 15 can be simplified and the cost can be reduced.

As described above, in the embodiment, there are a plurality (two) of "B-arms" supported in a cantilever manner. For that reason, the configuration of the robot arm 10 can be simplified, and the cost can be greatly reduced.

In the embodiment, the volume of the inside of the base 20 is equal to or smaller than the volume of the robot arm 10. For that reason, the degree of freedom of installation of the base 20 can be increased.

Drive Unit

As illustrated in FIG. 3, the robot 100 includes the same number (six in the embodiment) of drive units 30 as the arms 11 to 16. Each of the plurality of drive units 30 has a function of rotating the corresponding arm with respect to the arm (or base 20) positioned on the base end side thereof, and includes a motor unit 301 including a motor as a power supply and a brake, a power transmission mechanism (not illustrated) including a reduction gear 302, a belt (not illustrated), a pulley (not illustrated), and the like.

In the embodiment, one drive unit 30 is responsible for driving one arm. Accordingly, the robot 100 includes a first drive unit 31 for driving the arm 11, a second drive unit 32 for driving the arm 12, a third drive unit 33 for driving the arm 13, a fourth drive 34 for driving the arm 14, a fifth drive unit 35 for driving the arm 15, and a sixth drive unit 36 for driving the arm 16. In the following description, when the first drive unit 31, the second drive unit 32, the third drive unit 33, the fourth drive unit 34, the fifth drive unit 35, and the sixth drive unit 36 are not distinguished from each other, these drive units are respectively referred to as the drive unit 30.

As illustrated in FIG. 7, each of the motor unit 301 and the reduction gear 302 included in the first drive unit 31 is provided in the arm 11. Although not illustrated in detail, the first drive unit 31 includes a first pulley (not illustrated) connected to the shaft portion of the motor unit 301, a second pulley (not illustrated) disposed to be spaced apart from the first pulley and connected to the shaft portion of the reduction gear 302, and a belt (not illustrated) wound around the first pulley and the second pulley. The second pulley is connected to a bearing (not illustrated) included in the arm 11. With this configuration, the arm 11 is rotatable by being driven by the first drive unit 31. Matters substantially the same as those described above of the are applied to the second drive unit 32, the third drive unit 33, the fourth drive unit 34, the fifth drive unit 35, and the sixth drive unit 36, which will be described later, and the corresponding arm is driven through so-called belt drive.

As illustrated in FIG. 7, the motor unit 301 included in the second drive unit 32 is provided in the protruding portion 122, and the reduction gear 302 of the second drive unit 32 is provided at a connection portion between the arm 12 and the arm 11 (joint portion). The motor unit 301 included in the third drive unit 33 is provided in the protruding portion 122, and the reduction gear 302 included in the third drive unit 33 is provided at a connection portion (joint portion) between the arm 12 and the arm 13. Each of the motor unit 301 and the reduction gear 302 included in the fourth drive unit 34 is provided in the arm 13. The motor unit 301 included in the fifth drive unit 35 is provided in the portion 141 on the base end side of the arm 14 and the reduction gear 302 included in the fifth drive unit 35 is provided in the first portion 151 of the arm 15. The motor unit 301 included in the sixth drive unit 36 is provided in the portion 141 on the base end side of the arm 14 and the reduction gear 302 included in the sixth drive unit 36 is provided in the second portion 152 of the arm 15 (see FIG. 7). Although not illustrated, the sixth drive unit 36 includes a conversion mechanism for converting the transmission direction of the driving force of a bevel gear or the like by 90 degrees.

Position Sensor

As illustrated in FIG. 3, the robot 100 includes the same number of position sensors 40 as that of the drive units 30, and one position sensor 40 (angle sensor) is provided for one drive unit 30. The position sensor 40 detects a rotation angle of the rotation shaft (shaft portion) of the motor unit 301 (specifically, the motor) or the reduction gear 302. With this configuration, it is possible to obtain information such as an angle (orientation) of the arm on the tip end side with respect to the arm on the base end side. As each of these position sensors 40, for example, a rotary encoder or the like can be used. Each position sensor 40 is electrically connected to a control board 51 of the control unit 5 to be described later.

Control Unit

As illustrated in FIG. 3, the control unit 5 includes the control board 51, a power supply board 52 for supplying power to the control board 51, a plurality of drive boards 53 for driving the respective drive units 30 based on a command from the control board 51. The control board 51 and the power supply board 52 constitute a control device (controller) that supplies power for driving the robot 100 and controls driving of the robot 100.

Control Board

As illustrated in FIG. 7, the control board 51 is provided in the internal space S20 and includes a control circuit (not illustrated) for controlling driving of the robot 100. The control circuit includes a processor such as a central processing unit (CPU), a volatile memory such as a random access memory (RAM), a nonvolatile memory such as a read only memory (ROM), and the like, and controls driving of each portion of the robot 100 and performs control of driving of each portion of the robot 100 and processing such as various operations and determinations. For example, the control circuit is capable of executing a predetermined control program, and outputs a control signal to each drive board 53 according to the control program so as to cause the robot 100 (specifically, the robot arm 10) to execute a predetermined operation.

Power Supply Board

As illustrated in FIG. 7, the power supply board 52 is provided in the internal space S20, and includes a power supply circuit (not illustrated) for generating power to be supplied to the control board 51 and each drive board 53. The power supply circuit includes a transformer and a noise filter, converts the frequency and voltage of power supplied from an external power supply (not illustrated) such as a commercial power supply, and supplies the converted frequency and voltage to the control board 51 and each drive board 53. In particular, in the embodiment, the power supply circuit is provided with a converter for converting an AC voltage output from the external power supply into a DC voltage (drive voltage) of 20 V and outputting the DC voltage (drive voltage) to each drive board 53 or the like.

As illustrated in FIG. 8, the control board 51 and the power supply board 52 described above are respectively supported by support members 23 made of sheet metal or the like. The control board 51 is attached to the surface on the −y-axis side of the support member 23, for example, by screwing, and the power supply board 52 is attached to the surface on the +y-axis side of the support member 23 by, for example, screwing. The support member 23 can be attached to and detached from the base 20. Accordingly, the control board 51 and the power supply board 52 can be taken out together with the support member 23 to the outside of the base 20. With this configuration, for example, maintenance of the control board 51 and the power supply board 52 can be easily performed.

Drive Board

As illustrated in FIG. 7, each of the drive boards 53 is distributed and disposed in the internal space S10, and includes a drive circuit (not illustrated) that receives a control signal from the control board 51 and converts (generates) power into power to be supplied to the drive unit 30. The drive circuit includes, for example, an inverter circuit that converts DC power (current) to AC power (current).

In the embodiment, one drive board 53 is provided for one drive unit 30, and the drive board 53 corresponding to each drive unit 30 performs conversion (generation) of power to be supplied to the drive unit 30. Accordingly, the robot 100 includes a first drive board 531 corresponding to the first drive unit 31, a second drive board 532 corresponding to the second drive unit 32, a third drive board 533 corresponding to the third drive unit 33, a fourth drive board 534 corresponding to the fourth drive unit 34, a fifth drive board 535 corresponding to the fifth drive unit 35, and a sixth drive board 536 corresponding to the sixth drive unit 36. In the following description, in a case where the first drive board 531, the second drive board 532, the third drive board 533, the fourth drive board 534, the fifth drive board 535, and the sixth drive board 536 are not distinguished from each other, these boards are respectively referred to as the drive board 53.

As illustrated in FIG. 7, the first drive board 531 is provided in the arm 11, and is provided in the vicinity of the motor unit 301 included in the first drive unit 31. The second drive board 532 is provided in the protruding portion 122 of the arm 12 and is provided in the vicinity of the motor unit 301 included in the second drive unit 32. The third drive board 533 is provided in the protruding portion 122 of the arm 12 and is provided in the vicinity of the motor unit 301 included in the third drive unit 33. The fourth drive board 534 is provided in the arm 13 and is provided in the vicinity of the motor unit 301 included in the fourth drive unit 34. The fifth drive board 535 is provided in the arm 14 and is provided in the vicinity of the motor unit 301 included in the fifth drive unit 35. The sixth drive board 536 is provided in the arm 14 and is provided in the vicinity of the motor unit 301 included in the sixth drive unit 36.

External Connection Portion

As illustrated in FIGS. 2 and 4, the base 20 is provided with a plurality of external connection portions 50 constituted with connectors, for example. The external connection portion 50 is attached to the base 20 so that a portion thereof is exposed to the outside (see FIG. 8), and is electrically connected to the control board 51 and the power supply board 52. The external connection portion 50 is a component for connecting the plug 66 (connected portion) of the external cable 60 connected to, for example, an external power supply (not illustrated) or the like. That is, the external connection portion 50 is a component responsible for electrical connection between the robot 100 and external power supply, various devices, and the like.

As a specific example of such an external connection portion 50, for example, a power supply connector for connecting an external power plug electrically connected to an external power supply, a connector for inputting and outputting signals to and from various devices such as a teaching pendant used by a worker to give an operation instruction to the robot 100, a connector for outputting a signal to an end effector, and a connector for inputting and outputting data relating to a control program, and the like.

By connecting the plug 66 (connected portion) to such an external connection portion 50, power is supplied to the robot 100 and the robot 100 can be driven. For example, the plug 66 illustrated in FIG. 8 may be moved in the direction of the arrow A10 and the plug 66 (connected portion) may be connected to the external connection portion 50.

The basic configuration of the robot 100 has been described as above.

As described above, the control unit 5 having the function of the controller is accommodated inside the robot main body 1, that is, in the internal space S1. That is, the robot 100 includes control board 51 that is provided in the internal space S1 and the power supply board 52 that is provided in the internal space S1 and supplies power to the control board 51 and the drive board 53 (plural in the present embodiment)

that is provided in the robot arm 10 and drives the drive unit 30 based on a command from the control board 51.

With this configuration, since the controller and the robot main body 1 are integrated, it is unnecessary to separately consider the disposition of the controller and the robot main body 1 as in the related art, and the degree of freedom of disposition of the robot 100 can be increased. Further, as compared with the case where the controller is a separate body, it is possible to reduce the total installation area and to save time and effort such as connection to the controller.

As described above, the control board 51 is provided in the base 20.

With this configuration, it is easy to design the disposition of various wirings (not illustrated) for connecting the control board 51 and each drive board 53.

Furthermore, as described above, the power supply board 52 is provided in the base 20.

With this configuration, it is easy to design the disposition of various wirings (not illustrated) for connecting the power supply board 52 and each drive board 53. As compared with the case where the control board 51 and the power supply board 52 are provided in the robot arm 10, the control board 51 and the power supply board 52 can be stably disposed, and it is also possible to prevent an increase in load capacity of the tip end portion of the robot arm 10.

As described above, the robot arm 10 includes the arm 11 (first arm) rotatably connected to the base 20, and the first drive unit 31 for driving the arm 11 is provided in the arm 11.

With this configuration, the first drive unit 31 can be moved away from the control board 51 and the like provided in the base 20, as compared with the configuration in which the first drive unit 31 is disposed in the base 20. For that reason, it is possible to reduce thermal runaway caused by heat generated from the first drive unit 31 and heat generated from the control board 51 and the like, so that the robot 100 can be stably driven for a long time.

Furthermore, as described above, the robot arm 10 includes the arm 12 (second arm) rotatably connected to the arm 11 (first arm), and the second drive unit 32 for driving the arm 12 is provided in the arm 12.

With this configuration, heat generated from the first drive unit 31 and the second drive unit 32 can be eliminated more efficiently.

As described above, the robot arm 10 includes the plurality of arms 11 to 16 connected to each other, and the plurality of drive units 30 for independently driving the plurality of arms 11 to 16 are provided inside the robot arm 10. Then, the plurality of drive units 30 are dispersedly provided in the robot arm 10 (see FIG. 7).

With this configuration, since it is possible to disperse heat generated from the drive unit 30, thermal runaway can be reduced, and thus the robot 100 can be stably driven for a long time.

The disposition of the plurality of drive units 30 is not limited to the illustrated disposition. The "dispersion" described above includes not only that all of the plurality of drive units 30 are arranged separately but also that the plurality of drive units 30 are disposed in at least two groups.

In addition, as described above, the first drive board 531 for driving the first drive unit 31 is provided in the arm 11 (first arm) and the second drive board 532 for driving the second drive unit 32 is provided in the arm 12 (second arm).

With this configuration, the connection between the first drive board 531 and the first drive unit 31 and the connection between the second drive board 532 and the second drive unit 32 can be made in a simple configuration. Since heat generated from the first drive board 531 and the second drive board 532 can be dispersed, the robot 100 can be stably driven for a long time.

Furthermore, as described above, the plurality of drive boards 53 for independently driving the plurality of drive units 30, respectively, are provided in the robot arm 10. Then, the plurality of drive boards 53 are dispersedly provided in the robot arm 10.

With this configuration, it is possible to simplify connection between the drive board 53 and the corresponding drive unit 30, for example, as compared with a configuration in which the plurality of drive units 30 are driven by one drive board 53. Since the plurality of drive boards 53 are dispersedly provided, heat generated from the drive board 53 can be dispersed and thus, the robot 100 can be stably driven for a long time.

In particular, as illustrated in the drawing, it is preferable that each drive board 53 is provided in the vicinity of the corresponding drive unit 30. With this configuration, it is possible to remarkably reduce the number of wirings of a power supply system and the number of wirings of a signal system, as compared with the case where the plurality of drive boards 53 are disposed collectively in the base 20.

The disposition of the plurality of drive boards 53 is not limited to the illustrated disposition. The "dispersion" described above includes not only that all of the plurality of drive boards 53 are disposed separately but also that the plurality of drive boards 53 are disposed in at least two groups.

Exterior Members and Suction Hole of Robot

Figure 9:
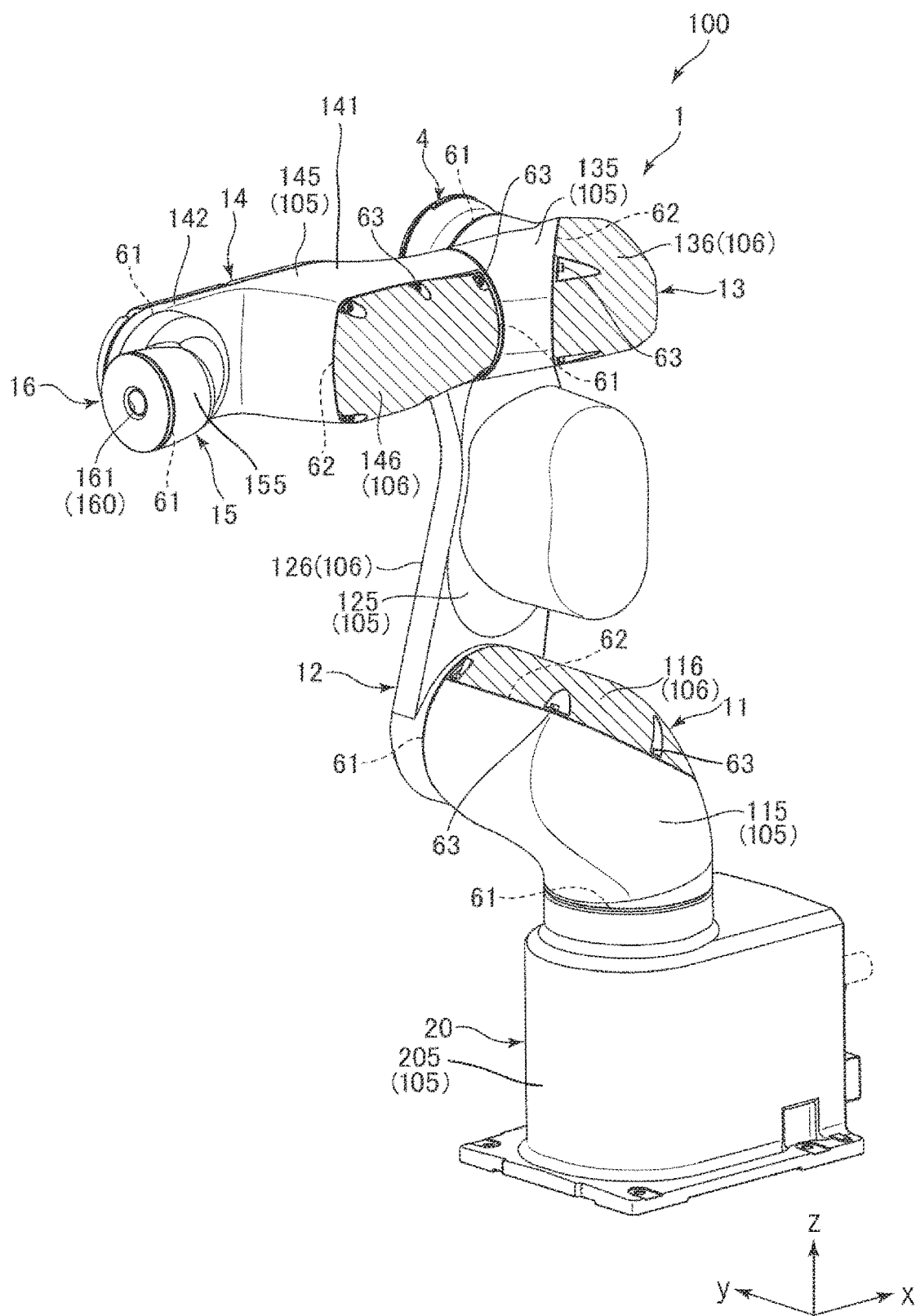
FIG. 9 is a diagram for explaining a plurality of housings and covers of the robot.
Figure 10:
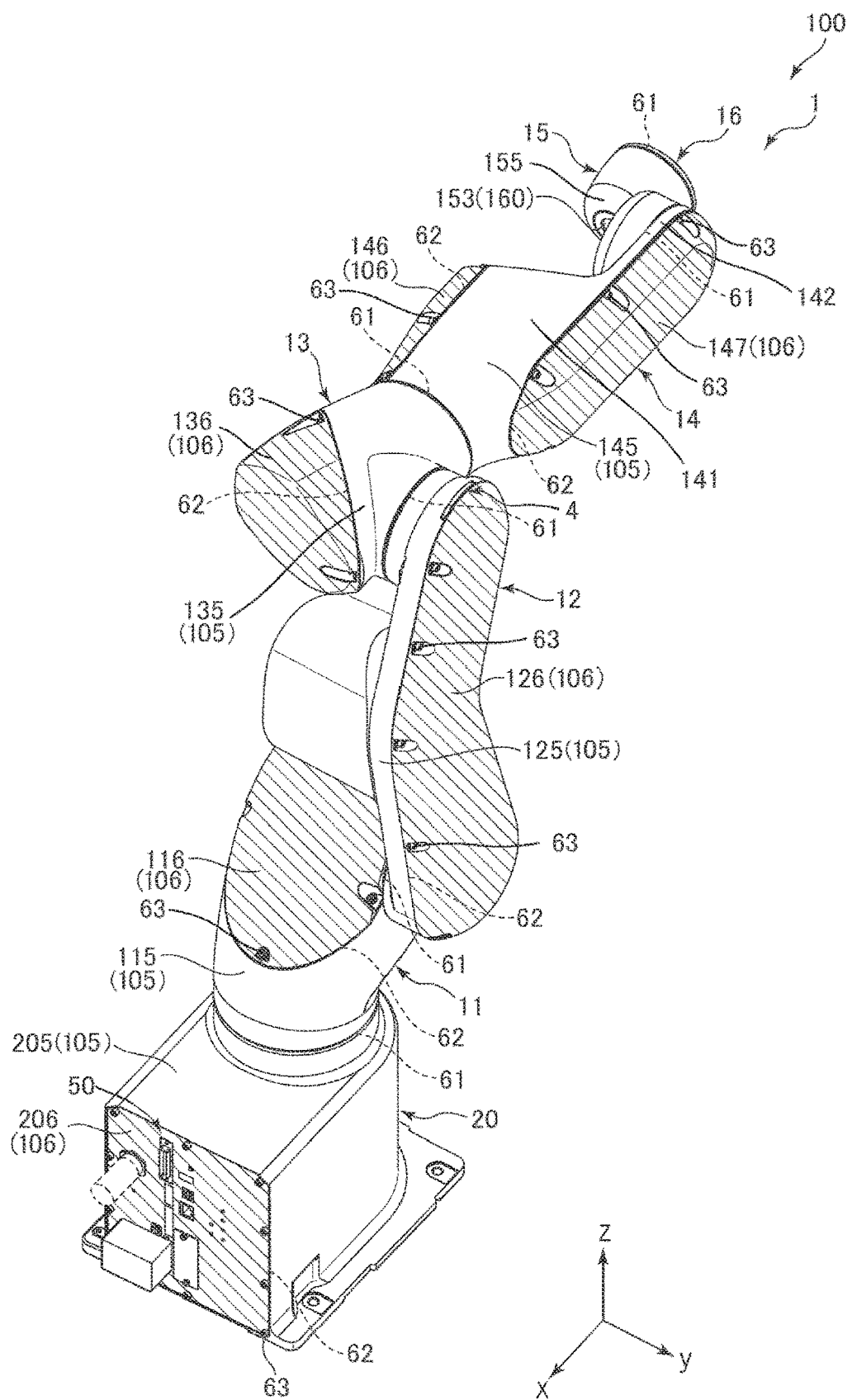
FIG. 10 is another diagram for explaining the plurality of housings and covers of the robot.

Each of FIGS. 9 and 10 is a diagram for explaining a plurality of housings and covers included in the robot.

Next, exterior members (housings 105, the covers 106, and the like) and sealing members 61 and 62 of the robot main body 1 will be described (see FIGS. 9 and 10). The robot 100 is provided with the exterior member (housings 105, the covers 106, and the like) and the sealing members 61 and 62 described below and accordingly, the robot 100 can airtightly seal the interior (internal space S1) of the robot main body 1, so that waterproof performance and dustproof performance can be exhibited.

Exterior Member

As described above, the robot main body 1 is configured to include a plurality of exterior members (housing 105, the cover 106, and the like). Specifically, as illustrated in FIGS. 9 and 10, each of the base 20 and the arms 11 to 14 includes the housing 105 and the cover 106, and the arm 15 includes a case 155. More specifically, the base 20 includes a housing 205 and a cover 206. The arm 11 includes a housing 115 and a cover 116. The arm 12 includes a housing 125 and a cover 126. The arm 13 includes a housing 135 and a cover 136. The arm 14 includes a housing 145, a cover 146, and a cover 147. The arm 15 includes the case 155. In the following description, when the housing 205, the housing 115, the housing 125, the housing 135, and the housing 145 are not distinguished from each other, these housings are referred to as the housing 105. Further, when the cover 206, the cover 116, the cover 126, the cover 136, the cover 146, and the cover 147 are not distinguished from each other, these covers are referred to as the cover 106.

The outer shape of the housing 205 of the base 20 is substantially rectangular parallelepiped. On the other hand, the outer shape of the cover 206 is a rectangular flat plate shape. The +x-axis side and the +z-axis side of the housing 205 are open, respectively, and the +x-axis side opening of the housing 205 is closed by the cover 206. With this configuration, the internal space S1 for accommodating the control board 51 and the power supply board 52 is formed.

The housing 115 of the arm 11 opens to the base end (−z-axis side) thereof and the +z-axis side and the +y-axis side of the tip end portion thereof. The housing 115 is disposed in a state in which an edge portion forming the opening (−z-axis side opening) of its base end portion is joined to an edge portion forming the +z-axis side opening of the housing 205. Specifically, a boundary portion between the housing 115 and the housing 205, that is, a joint portion (specifically, including various internal components and the like) between the arm 11 and the base 20 is connected via a sealing member 61 such as a packing, a metal ring, an oil seal or the like. With this configuration, the arm 11 is rotatably connected to the base 20. The +x-axis side opening of the front end portion of the housing 115 is closed by the cover 116. Specifically, the housing 115 and the cover 116 are connected via a sealing member 62, and the cover 116 is screwed to the housing 115 by the screws 63. With this configuration, the housing 115 and the cover 116 are fixedly connected to each other.

The housing 125 of the arm 12 is positioned on the −y-axis side with respect to the cover 126, and mainly forms a portion on the −y-axis side of the flat portion 121 and the protruding portion 122. On the other hand, the cover 126 is positioned on the +y-axis side with respect to the housing 125, and mainly forms a portion on the +y-axis side of the flat portion 121. The housing 125 opens to the −y-axis side of the base end portion, the −y-axis side of the tip end portion, and the whole area on the +y-axis side. The housing 125 is disposed in a state in which an edge portion forming a −y-axis side opening of the base end portion thereof is joined to an edge portion forming the +y-axis side opening of the tip end portion of the housing 115. Specifically, the boundary portion between the housing 125 and the housing 115, that is, the joint portion between the arm 12 and the arm 11 is connected via the sealing member 61 such as a packing, a metal ring, an oil seal, or the like. With this configuration, the arm 12 is rotatably connected to the arm 11. Further, the +y-axis side opening of the housing 125 is closed by the cover 126. Specifically, the housing 125 and the cover 126 are connected via a sealing member 62, and the cover 126 is screwed to the housing 125 by the screws 63. With this configuration, the housing 125 and the cover 126 are fixedly connected to each other.

The housing 135 of the arm 13 opens to the base end portion (+y-axis side), the tip end portion (−x-axis side), and the +x-axis side of the intermediate portion. The housing 135 is disposed in a state where an edge portion forming the opening (+y-axis side opening) of the base end portion thereof is joined to an edge portion forming the −y-axis side opening of the tip end portion of the housing 125. Specifically, the boundary portion between the housing 135 and the housing 125, that is, the joint portion between the arm 13 and the arm 12 is connected via the sealing member 61 such as a packing, a metal ring, an oil seal or the like. With this configuration, the arm 13 is rotatably connected to the arm 12. The +x-axis side opening of the intermediate portion of the housing 135 is closed by the cover 136. Specifically, the housing 135 and the cover 136 are connected via the sealing member 62, and the cover 136 is screwed to the housing 135 by the screws 63. With this configuration, the housing 135 and the cover 136 are fixedly connected to each other.

The housing 145 of the arm 14 forms most of the base end side portion 141 and most of the tip end side portion 142. On the other hand, the cover 146 forms the remaining portion of the base end side portion 141, and the cover 147 forms the remainder of the tip end side portion 142. Further, the housing 145 opens to the base end portion (+x-axis side) thereof, the −y-axis side in the base end side portion 141, and almost the whole area on the +y-axis side. The housing 145 is disposed in a state in which an edge portion forming the opening (+x-axis side opening) of the base end portion thereof is joined to an edge portion forming the tip end side opening (-x-axis side opening) of the housing 135. Specifically, the boundary portion between the housing 145 and the housing 135, that is, the joint portion between the arm 14 and the arm 13 is connected via the sealing member 61 such as a packing, a metal ring, an oil seal or the like. With this configuration, the arm 14 is rotatably connected to the arm 13. Further, the −y-axis side opening in the base end side portion 141 of the housing 145 is closed by the cover 146. Specifically, the housing 145 and the cover 146 are connected via the sealing member 62, and the cover 146 is screwed to the housing 145 by the screws 63. With this configuration, the housing 145 and the cover 146 are fixedly connected to each other. Similarly, the +y-axis side opening of the housing 145 is closed by the cover 147. Specifically, the housing 145 and the cover 147 are connected via the sealing member 62, and the cover 147 is screwed to the housing 145 by the screws 63. With this configuration, the housing 145 and the cover 147 are fixedly connected to each other.

The case 155 of the arm 15 forms the whole are of exterior of the arm 15, and opens to the base end portion (+y-axis side) thereof and the tip end portion (−x-axis side) thereof. The case 155 is disposed in a state in which the edge portion forming the opening (+y-axis side opening) of the base end portion thereof is joined to the edge portion forming the front end side opening (−y-axis side opening) of the housing 145. Specifically, the boundary portion between the case 155 and the housing 145, that is, the joint portion between the arm 15 and the arm 14 is connected via the sealing member 61 such as a packing, a metal ring, an oil seal or the like. With this configuration, the arm 15 is rotatably connected to the arm 14. The disk-shaped arm 16 is rotatably connected to the edge portion which forms opening (−x-axis side opening) of the tip end portion of the case 155 via the sealing member 61.

As such, the robot 100 includes the plurality of housings 105, the plurality of covers 106, the case 155, and the plurality of sealing members 61 and 62. With this configuration, it is possible to form the internal space S1 airtightly sealed. Specifically, for example, it is possible to exhibit waterproof performance and dustproof performance of IP67 grade conforming to the international electrotechnical commission (IEC) standard 60529.

First Space and Second Space

Next, first space A1 and second space A2 of the arm 12 will be described (see FIG. 11).

In the first embodiment, each of the arms 11, 13 to 15 includes space for accommodating the drive unit 30, but the arm 12 includes the space (first space A1) for accommodating the illumination unit 4 to be described later in addition to the space (second space A2) that accommodates the drive unit 30.

Figure 11:
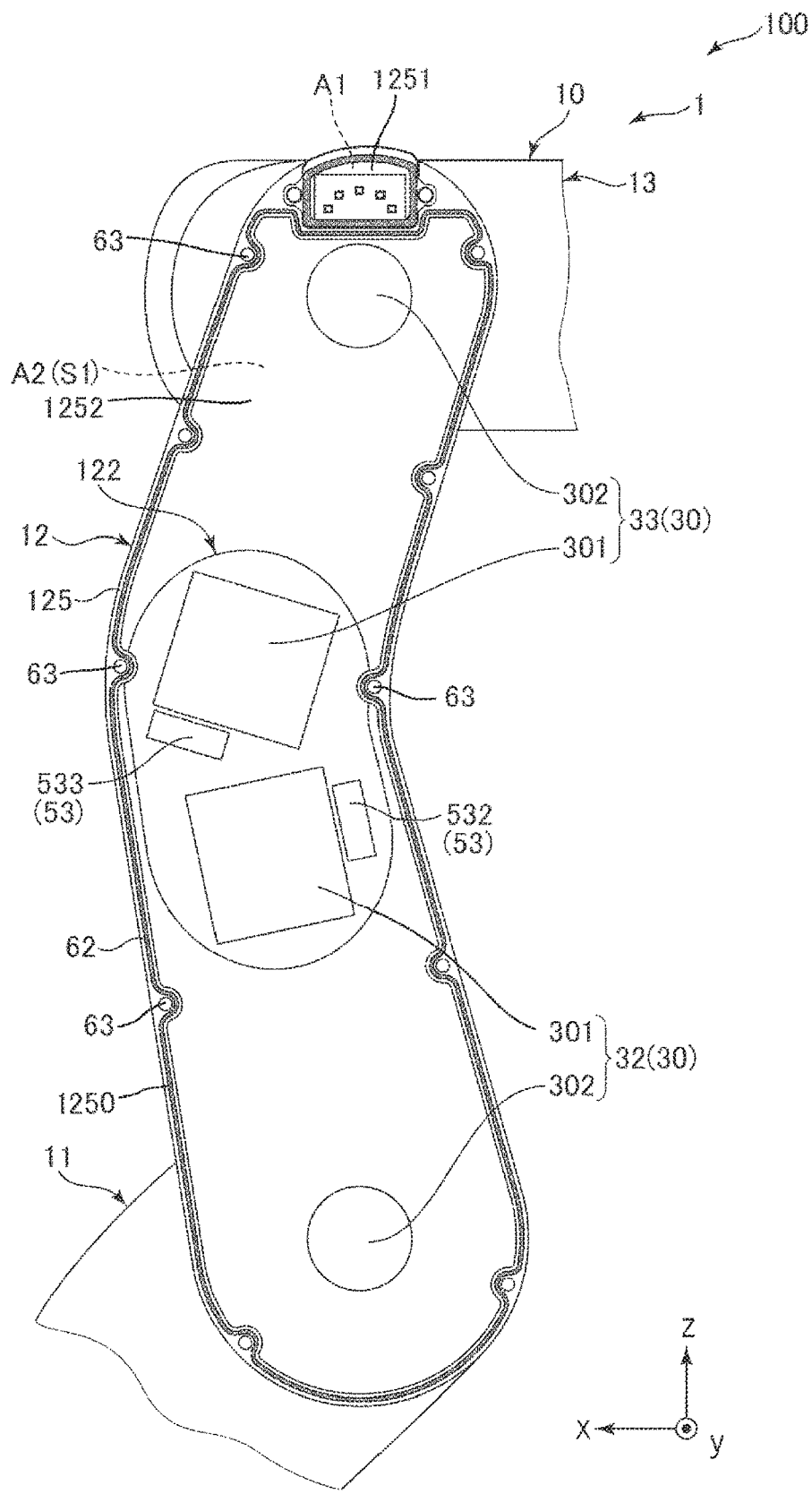
FIG. 11 is a diagram for explaining a first concave portion and a second concave portion included in a housing.

FIG. 11 is a diagram for explaining the first concave portion and the second concave portion included in the housing. FIG. 11 illustrates a diagram of the housing 125 as viewed from the +y-axis side opening side of the housing 125 in a state where the cover 126 is removed.

As illustrated in FIG. 11, the housing 125 includes a first concave portion 1251 (a first recess) positioned on the tip end side and a second concave portion 1252 (a second recess) positioned on the base end side of the first concave portion 1251 and having an opening area larger than that of the first concave portion 1251. The cover 126 is connected to the housing 125 such that the first space A1 in which the illumination unit 4 described below is disposed is formed by the first concave portion 1251 and the second space A2 in which the second drive unit 32 and the third drive unit 33 are disposed is formed by the second concave portion 1252.

The second space A2 constitutes a portion of the internal space S1 of the robot arm 10. That is, although not illustrated in detail, the second space A2 communicates with the inside (space) of the arm 11 and the inside (space) of the arm 13. Accordingly, it can be said that the first space A1 is space provided separately from the internal space S1.

The sealing member 62 (first sealing member) described above is provided on an edge portion 1250 that forms the opening of the second concave portion 1252 of the housing 125, and is disposed so as to pass through the inside of the screw 63. With the sealing member 62 disposed in this way, the housing 125 and the cover 126 are connected as described above. Although not illustrated, the disposition of the sealing member 62 provided between the other housing 105 and the cover 106 is the same as this.

Illumination Unit

Next, the illumination unit 4 having a function as an indication lamp will be described (see FIGS. 1, 2, 4 to 6, and 12).

Figure 12:
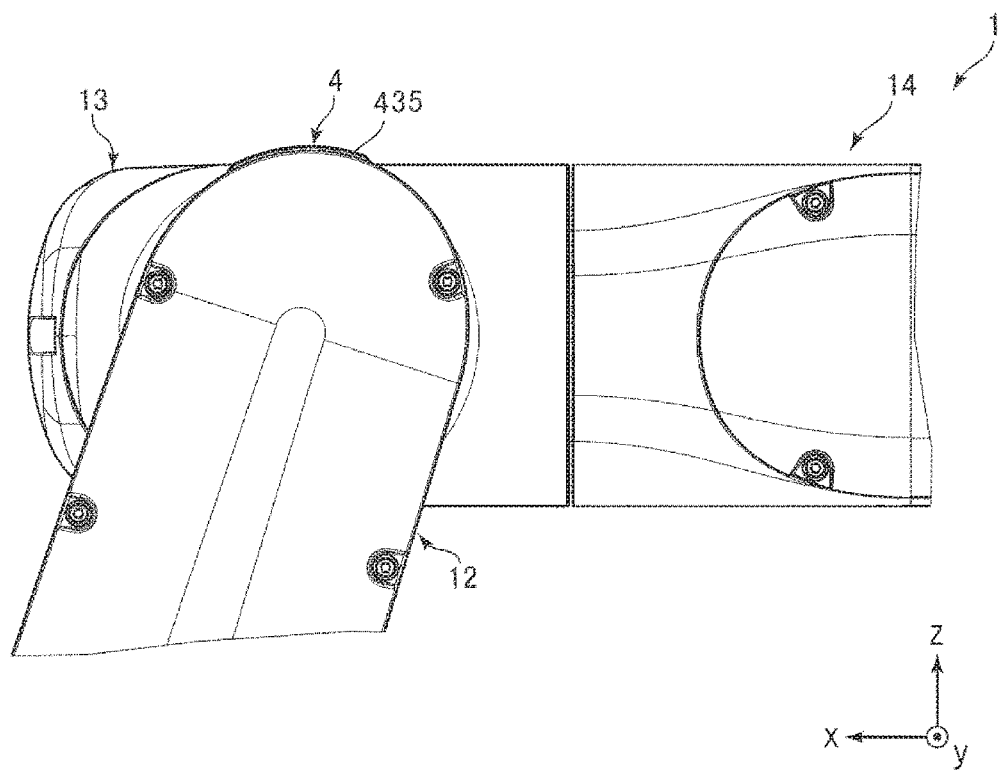
FIG. 12 is a diagram of an illumination unit included in the robot illustrated in FIG. 1 as viewed from the +y-axis side.
Figure 13:
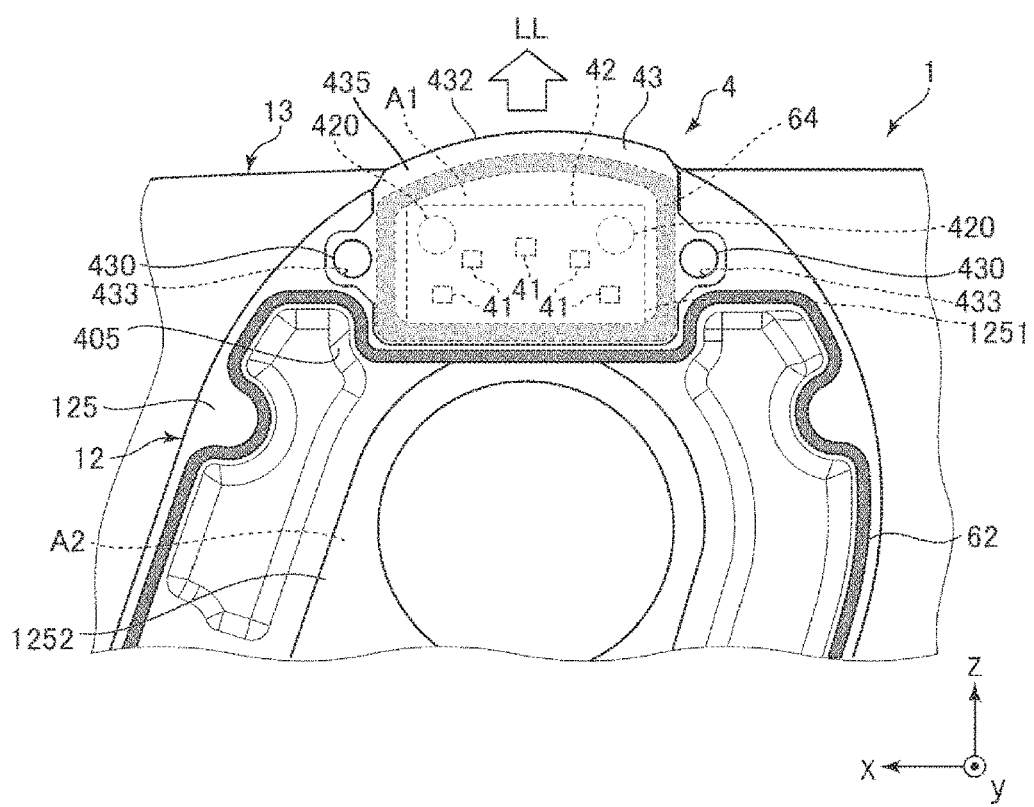
FIG. 13 is a diagram schematically illustrating a configuration of an illumination unit and a light emission direction.
Figure 14:
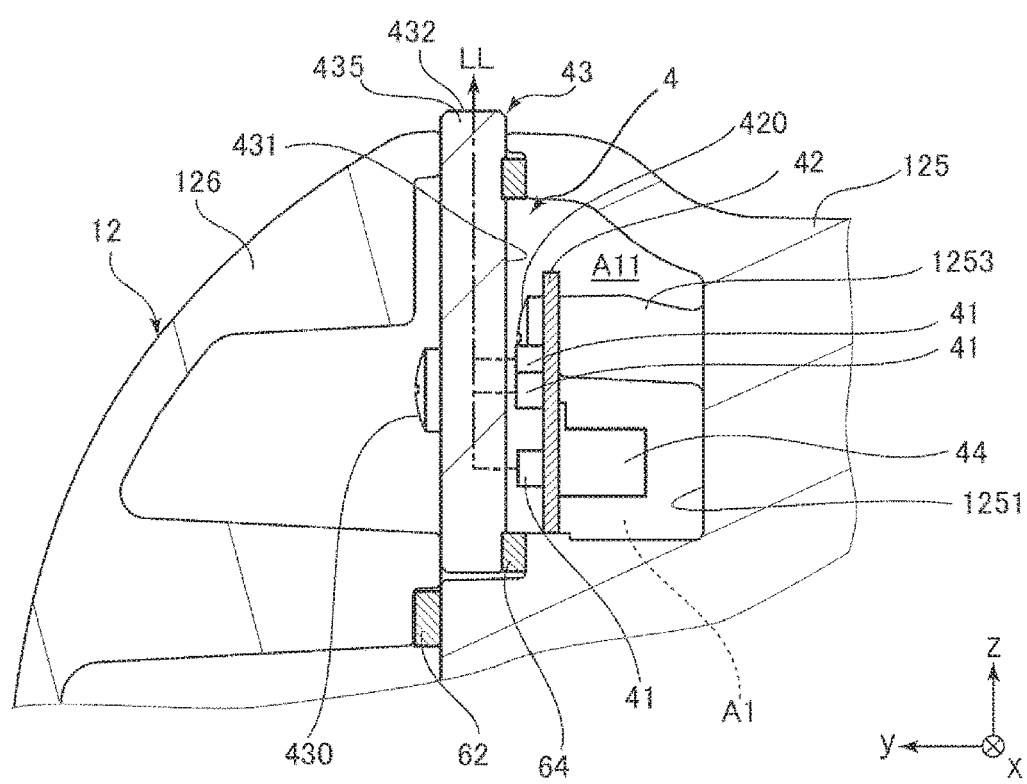
FIG. 14 is another diagram schematically illustrating the configuration of the illumination unit and the light emission direction.
Figure 15:
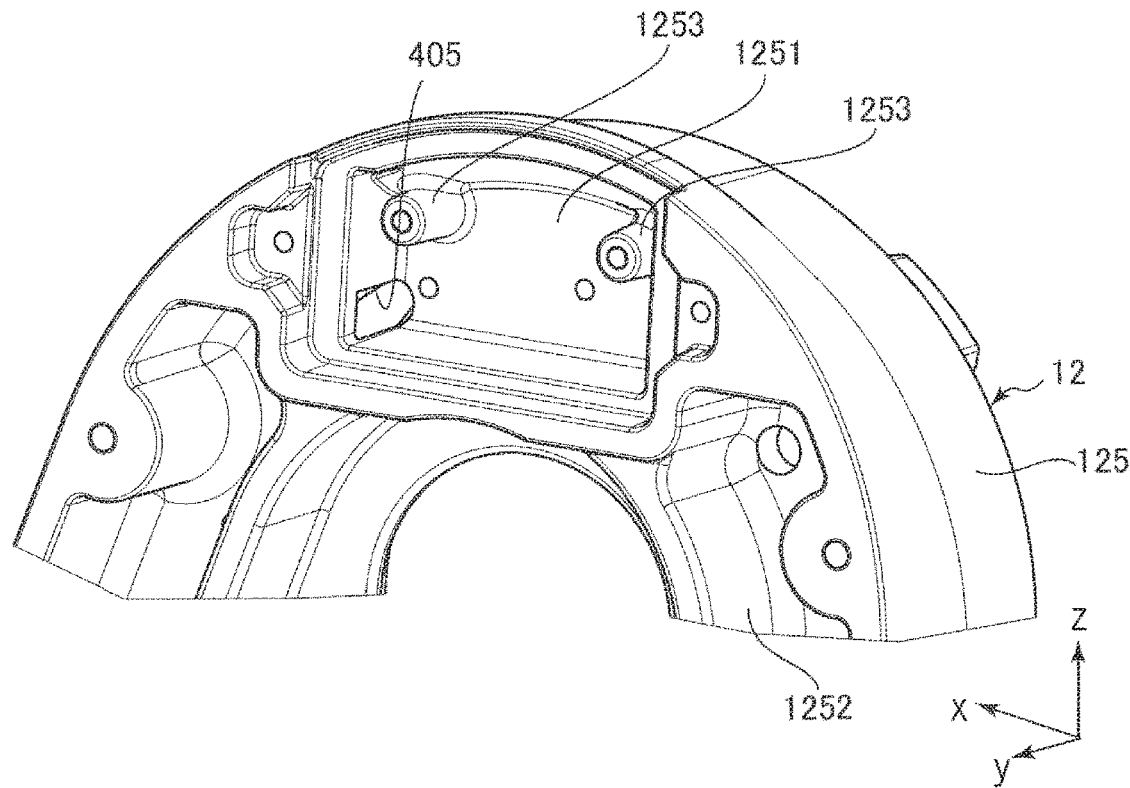
FIG. 15 is a diagram for explaining a hole (wiring hole) included in the housing.
Figure 16:
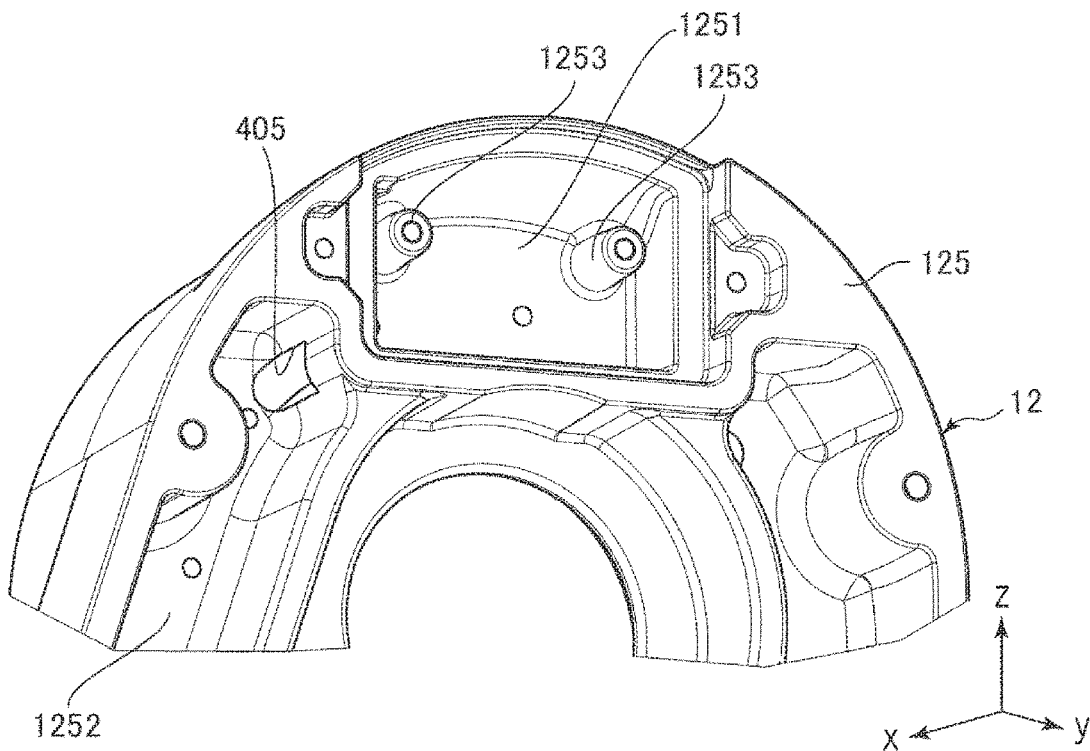
FIG. 16 is another diagram for explaining the hole (wiring hole) included in the housing.
Figure 17:
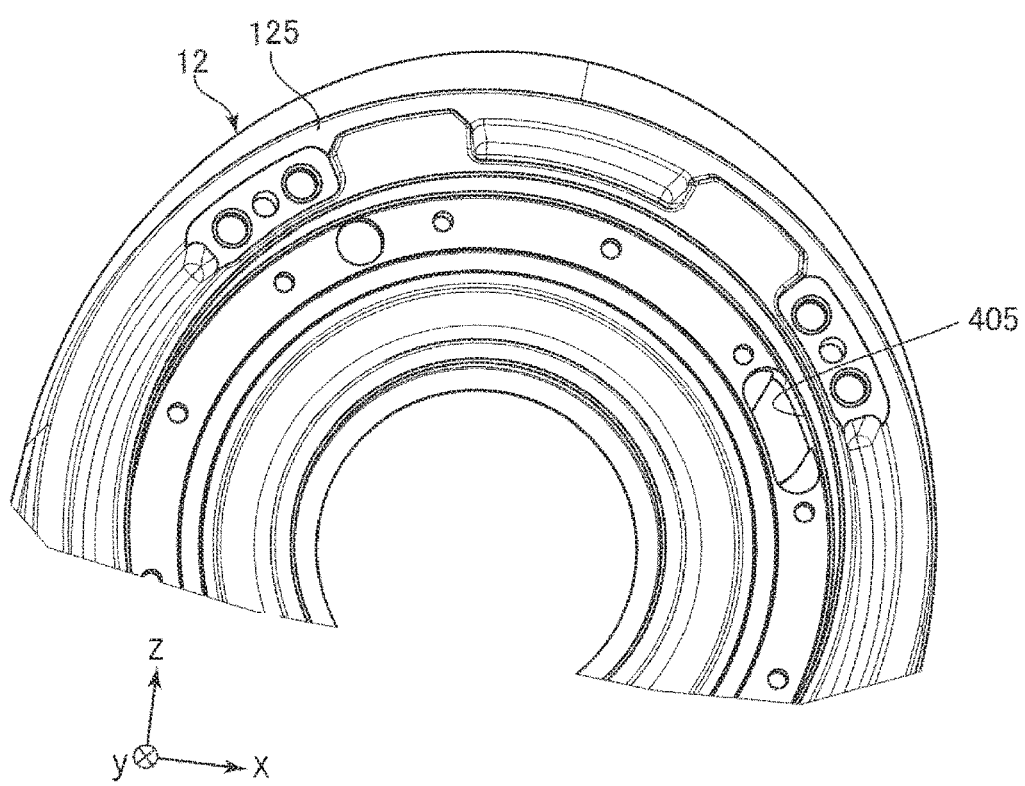
FIG. 17 is another diagram for explaining the hole (wiring hole) included in the housing.

FIG. 12 is a diagram of the illumination unit of the robot illustrated in FIG. 1 as viewed from the +y-axis side. FIG. 13 and FIG. 14 are diagrams schematically illustrating the configuration of the illumination unit and the light emission direction, respectively. FIGS. 15 to 17 are diagrams for explaining a hole (wiring holes of the housing, respectively.

The illumination unit 4 illustrated in FIG. 12 has, for example, a function as an indication lamp for informing the worker that the robot 100 is in an operable state, that is, the state in which the robot 100 is powered on.

The illumination unit 4 (light emitting unit) is provided on the robot arm 10 of the robot main body 1, and is disposed at a position where the worker can visually recognize a portion of the illumination unit 4 from the x-axis direction, y-axis direction, and +z-axis direction (See FIGS. 1, 2, 4 to 6, and 12).

Hereinafter, the basic configuration of each portion of the illumination unit 4 will be described. As illustrated in FIGS. 13 and 14, the illumination unit 4 includes a plurality of (five in the first embodiment) light emitting elements 41, a board 42 (circuit board) on which the light emitting elements 41 are mounted, and a light guide plate 43 that guides light LL emitted from the light emitting elements 41 to the outside.

Light Emitting Element

Each of the plurality of light emitting elements 41 is constituted with, for example, alight emitting diode (LED). Further, as illustrated in FIG. 13, the plurality of light emitting elements 41 are disposed in an arch shape corresponding to the shape of the tip end portion of the arm 12 (shape viewed from the y-axis direction).

Board

As illustrated in FIG. 14, the board 42 (circuit board) has its plate surface disposed along the xz-plane and is fixed to the housing 125 so that the plurality of light emitting elements 41 mounted on the board 42 are positioned on +y-axis side of the board 42. Specifically, the housing 205 includes a protruding portion 1253 protruding from the bottom surface of the first concave portion 1251 (see FIGS. 14 and 15), and the board 42 is screwed to the protruding portion 1253 by a screw 420 (see FIGS. 13 and 14).

The board 42 includes a circuit electrically connected to the plurality of light emitting elements 41, and a connector 44 is provided on the surface on the −y-axis side of the board 42. The connector 44 is electrically connected to the control board 51 and the power supply board 52 via wiring (cable) (not illustrated). With this configuration, power is supplied to the light emitting element 41.

Here, as illustrated in FIGS. 15 to 17, the hole 405 for communicating the first concave portion 1251 (first space A1) with the second concave portion 1252 (second space A2) is formed in the housing 125. The hole 405 can be inserted through a wiring (cable) (not illustrated) connected to the connector 44 and functions as a wiring hole. The hole 405 is formed is formed in such a way that a portion of the bottom surface and the side surface of the first concave portion 1251 and a portion of the bottom surface and the side surface of the second concave portion 1252 from the surface (surface opposite to the connection surface with the cover 126) on the +y-axis surface side of the housing 125 are collectively cut out (see FIGS. 15 to 17).

Light Guide Plate

The light guide plate 43 illustrated in FIGS. 13 and 14 has a function of guiding light LL emitted from the light emitting element 41 to the outside. The light guide plate 43 is a plate-like member having light transmitting property, and can be constituted with, for example, a transparent or milky white resin member or a glass member. As illustrated in FIG. 13, the tip end surface 432 of the light guide plate 43 has an arch shape corresponding to the shape (shape viewed from the y-axis direction) of the tip end portion of the arm 12, and the tip end portion of the light guide plate 43 includes an exposed portion 435 exposed to the outside of the outer peripheral surface of the arm 12.

Also, as illustrated in FIG. 14, the light guide plate 43 is disposed between the housing 125 and the cover 126. The light guide plate 43 is disposed substantially parallel to the board 42, and is fixed to the housing 125 so as to be separated from the light emitting element 41 on the +y-axis side of the light emitting element 41. Specifically, as illustrated in FIG. 13, the light guide plate 43 includes a plurality of screw holes 433, and is fixed to a portion forming the opening of the first concave portion 1251 of the housing 125 by the screw holes 433 and a plurality of screws 430. A sealing member 64 (second sealing member) is interposed between the light guide plate 43 and the housing 125, and the light guide plate 43 and the cover 126 are in contact with each other (see FIG. 14). Since the sealing member 64 is disposed between the light guide plate 43 and the housing 125, space A11 formed by the housing 125 and the light guide plate 43 is airtightly sealed.

Such a light guide plate 43 has an incident surface 431 on which light LL is incident, and is provided so that the incident surface 431 intersects (preferably orthogonally to) an optical axis of light LL. Then, the light guide plate 43 guides light LL toward a tip end surface 432 while bending a large number of beams of light LL therein. With this configuration, since the light LL emitted from the light emitting element 41 can be emitted to the outside, the worker can visually recognize display of light LL from the illumination unit 4.

As described above, the robot 100 includes the robot main body 1 which includes the base 20 and the arm 12 configured to include the housing 125 (first casing) and the cover 126 (second casing) connected to the housing 125, the second drive unit 32 (drive unit 30) that drives the arm 12, and the light emitting element 41 (plural in the first embodiment) that emits light (see FIGS. 1 and 7, and the like). The housing 125 (first casing) and the cover 126 (second casing) form first space A1 and second space A2 isolated from the first space A1 in a state where the housing 125 and the cover 126 are connected to each other, and the light emitting element 41 is disposed in the first space A1 and the drive unit 30 (specifically, the second drive unit 32 and the third drive unit 33) is disposed in the second space A2 (see FIGS. 11, 13, and 14).

According to such a robot 100, since the light emitting element 41 is disposed in the first space A1 isolated from the second space A2 in which the second drive unit 32 and the third drive unit 33 are disposed, it is possible to reduce leakage of light LL emitted from the light emitting element 41 into the robot main body 1 (in the arm 12) compared with the case where the second drive unit 32, the third drive unit 33, and the light emitting element 41 are disposed in the same space. For that reason, visibility of display using the light LL emitted from the light emitting element 41 can be enhanced.

In the first embodiment, the first space A1 and the second space A2 are formed by the housing 125 and the cover 126, but the first space A1 and the second space A2 may be formed by the housing 105 and the cover 106 forming the other arms 11 to 14. The first space A1 and the second space A2 may also be formed by the housing 205 and the cover 206. The first casing and the second casing may be members that form internal space S10 (that is, members constituting the exterior of the arm 12), respectively, and are not limited to the configuration of the housing 125 and the cover 126. For example, the installation position of the illumination unit 4 is not limited to the arm 12, and may be provided, for example, in the arms 11, 13, and 14.

As described above, the robot 100 (more specifically, illumination unit 4) includes the light guide plate 43 has the incident surface 431 receiving light LL emitted from the light emitting element 41 that is provided in the first space A1. The light guide plate 43 includes the exposed portion 435 exposed to the outside of the arm 12 (see FIGS. 12 to 14).

By having such a light guide plate 43, light LL emitted from the light emitting element 41 can be more reliably emitted toward the outside. Furthermore, since a portion of the light guide plate 43 is exposed to the outside, that is, by having the exposed portion 435, it is possible to improve visibility of display using the light LL emitted from the light emitting element 41 over a wider range.

Furthermore, the exposed portion 435 is positioned at an outside of the arm 12 from a portion (outer surface positioned around the exposed portion 435 of the housing 125 and the cover 126 in the first embodiment, a first are) positioned around the exposed portion 435 of the arm 12.

In other words, as viewed from the x-axis direction and the y-axis direction, the exposed portion 435 protrudes toward the outside from a portion positioned on the outer circumferential surface of the arm 12 around the exposed portion 435 (see FIGS. 4, 5, and 12). With this configuration, visibility of display using the light LL emitted from the light emitting element 41 can be further improved over a wider range. Even when the robot arm 10 rotates, the illumination unit 4 can be visually recognized from either direction.

As described above, the housing 125 (first casing) includes the first concave portion 1251 and the second concave portion 1252 different from the first concave portion 1251, and the first concave portion 1251 forms the first space A1 and the second concave portion 1252 forms the second space A2 in a state where the housing 125 (first casing) and the cover 126 (second casing) are connected to each other. The portion (a second area) forming the opening of the second concave portion 1252 of the housing 125 (first casing) and the cover 126 (second casing) are connected via a sealing member 61 (first sealing member).

With this configuration, the second space A2 provided with the second drive unit 32 and the third drive unit 33 can be airtightly sealed. For that reason, it is possible to reduce or prevent intrusion of dust, water, and the like into the second space A2 and thus, the robot 100 can be suitably used under an environment requiring waterproof performance or dustproof performance.

As described above, the light guide plate 43 is provided between the portion forming the opening of the first concave portion 1251 of the housing 125 (first casing) and the cover 126 (second casing). The portion (a third are) forming the opening of the first concave portion 1251 of the housing 125 (first casing) and the light guide plate 43 are connected via a sealing member 64 (second sealing member), and the light emitting element 41 is provided in the space A11 between the housing 125 and the light guide plate 43 (see FIG. 14).

With this configuration, the space A11 in which the light emitting element 41 is provided can be airtightly sealed. For that reason, it is possible to reduce or prevent intrusion of dust, water, and the like into the space A11 in which the light emitting element 41 is provided and thus, the robot 100 can be suitably used under an environment requiring waterproof performance or dustproof performance.

On the other hand, as described above, the cover 126 (second casing) and the light guide plate 43 are in contact with each other. That is, airtight sealing is not provided between the cover 126 (second casing) and the light guide plate 43.

No light emitting element 41 and drive unit 30 are disposed between the cover 126 and the light guide plate 43, and even if dust, water or the like intrudes between these elements, deterioration or breakdown of the light emitting element 41 and the drive unit 30 does not occur. Since there is no need to provide a sealing member or the like for sealing between the cover 126 and the light guide plate 43, the light guide plate 43 and the cover 126 can be easily assembled with respect to the housing 125. Further, it is possible to omit the time and effort of forming a sealing member having complicated shapes corresponding to the shapes of both the light guide plate 43 and the cover 126, and it is easy to design the light guide plate 43 and the cover 126, for example.

As described above, the hole 405 for communicating the first concave portion 1251 with the second concave portion 1252 is provided (see FIGS. 15 to 17).

With this configuration, for example, the hole 405 can be used as a wiring hole through which a wiring (not illustrated) for supplying power to the light emitting element 41 is inserted. In the first embodiment, as described above, since the space A11 and the second space A2 are airtightly sealed, it is also possible to ensure waterproof performance for the wiring inserted through the hole 405.

As described above, the hole 405 is formed in such a way that a portion of the bottom surface and the side surface of the first concave portion 1251 and a portion of the bottom surface and the side surface of the second concave portion 1252 from the surface (surface opposite to the connection surface with the cover 126) on the +y-axis surface side of the housing 125 are collectively cut out (see FIGS. 15 to 17). With this configuration, since the hole 405 for communicating the space A11 with the second space A2 can be easily formed, it is possible to reduce the processing time and the processing cost informing the hole 405.

The light emitting element 41 is a light emitting diode (LED).

With this configuration, it is possible to realize a display with relatively low power consumption and excellent visibility over a long period of time. The light-emitting element 41 may be constituted with a semiconductor laser, an organic EL element, or the like.

The robot 100 according to the embodiment has been described as above. The robot 100 having the configuration as described above has a fan-less structure. That is, the robot main body 1 is not provided with a fan for generating airflow in the internal space S1.

With this configuration, countermeasures against dust generation are particularly easy. As described above, the power supply board 52 includes a converter (not illustrated) that converts power into a DC voltage of 20 V (relatively low drive voltage) and outputs the drive voltage to each drive board 53 or the like, thereby capable of realizing a fan-less structure.

The robot 100 may include a fan (not illustrated). In that case, a member (for example, a heat exchanger or the like) having a function of absorbing or discharging heat generated from the robot 100 may be provided for the robot 100. However, as described above, if the robot 100 has a fan-less structure, it is possible to save time and labor for separately providing the member such as a heat exchanger, thereby saving labor and time of the worker. The robot 100 having a fan-less structure can be suitably used even under an environment with higher cleanliness.

The robot 100 as described above can be suitably used under an environment with high cleanliness. In particular, the robot 100 can be suitably used under an environment of a cleanliness class of Class 2 or more based on the international unified standard (ISO) 14644-1: 2015. In that case, for example, it is preferable to provide the member (such as a heat exchanger) having a function of absorbing or discharging heat generated from the robot 100 to the robot 100.

Second Embodiment

Next, a second embodiment of the invention will be described.

Figure 18:
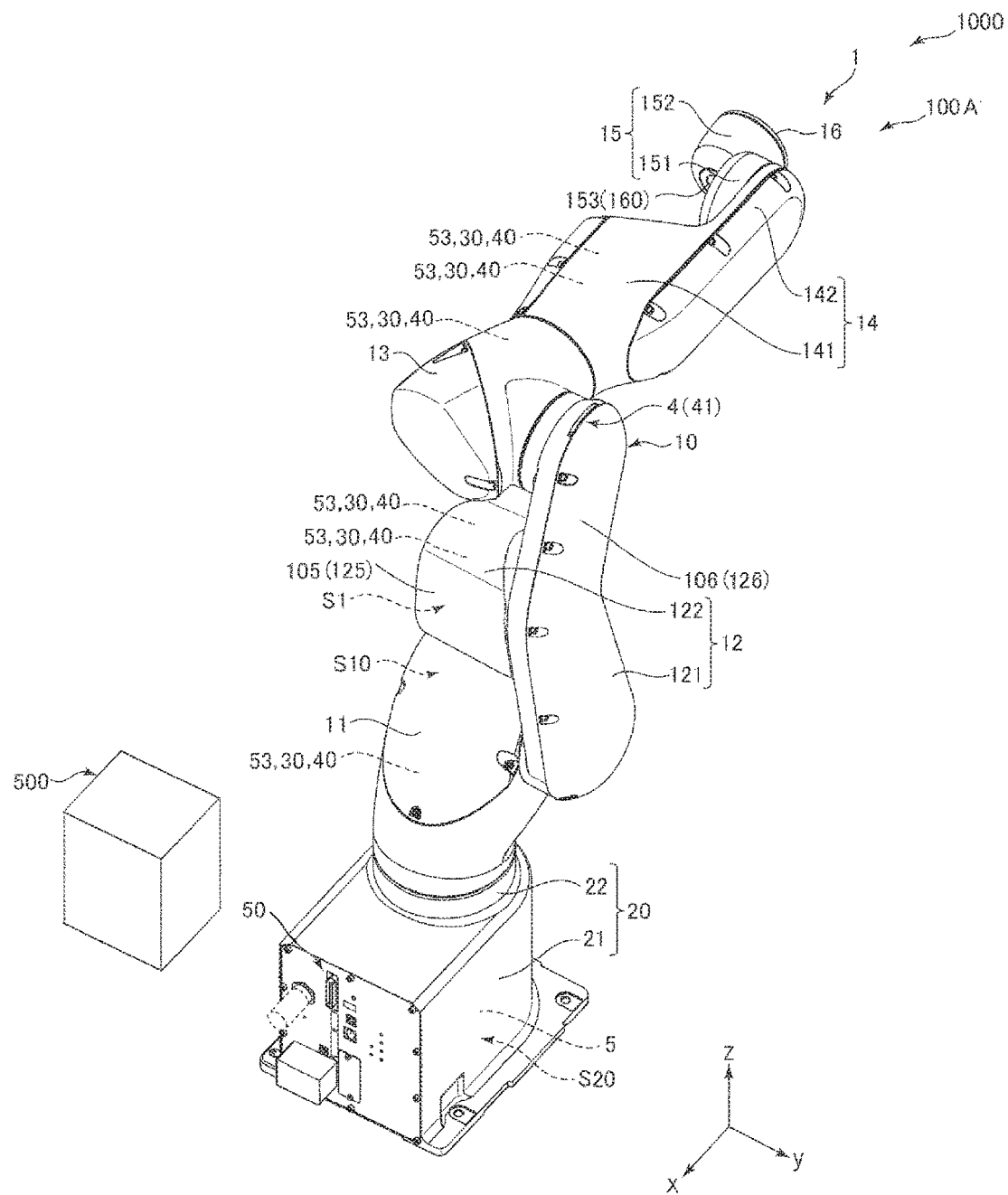
FIG. 18 is a perspective view schematically illustrating a portion of a robot system according to a second embodiment.
Figure 19:
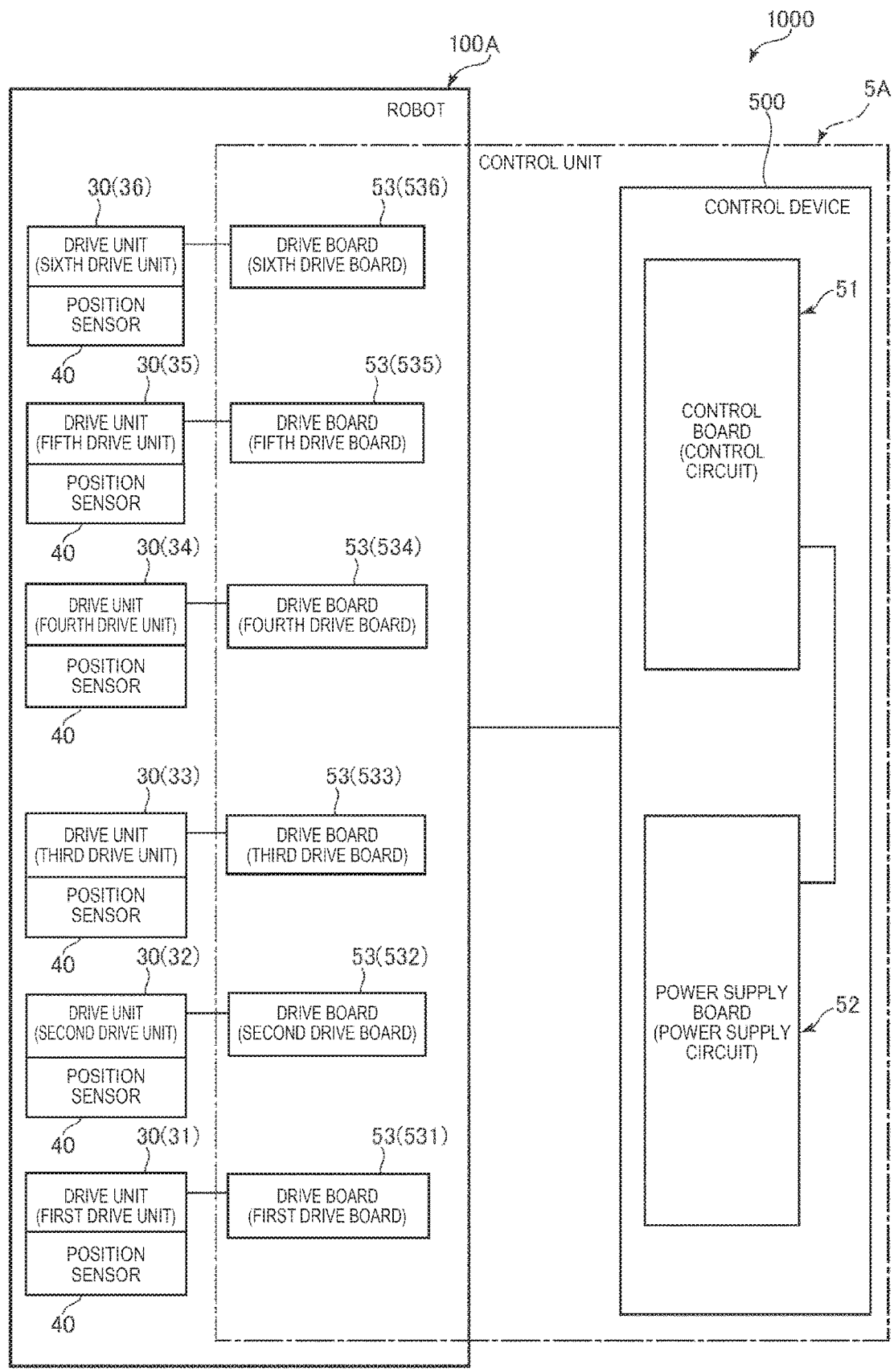
FIG. 19 is a system block diagram of the robot system illustrated in FIG. 18.

FIG. 18 is a perspective view schematically illustrating a portion of a robot system according to the second embodiment. FIG. 19 is a system block diagram of the robot system illustrated in FIG. 18.

The second embodiment is similar to the first embodiment described above except that a control device (controller) including the control board and the power supply board is provided separately from the robot main body. In the following description, description of the second embodiment will be mainly made on differences from the first embodiment described above, and description of similar matters will be omitted.

As illustrated in FIG. 18 and FIG. 19, in the second embodiment, a control device 500 (controller) is provided separately from the robot 100A. In the second embodiment, description will be made on a robot system 1000 including a robot 100A and a control device 500 (controller) provided separately from the robot 100A.

A robot system 1000 includes a robot 100A including a robot main body 1, the plurality of drive units 30, the plurality of position sensors 40, and the plurality of drive boards 53, and the control device 500 including the control board 51 and the power supply board 52. The robot 100A and the control device 500 may be wired connection or wireless connection. The control unit 500 and the plurality of drive boards 53 constitute a control device 5A. The control unit 5A exhibits the same function as the control unit 5 in the first embodiment.

Such a robot system 1000 includes the robot 100A which includes the robot main body 1 that includes the base 20 and the arm 12 configured to include the housing 125 (first casing) and the cover 126 (second casing) connected to the housing 125, the second drive unit 32 (drive unit (30)) that drives the arm 12, and the light emitting element 41 (plural in the second embodiment) that emits light LL and the control device 500 that is provided separately from the robot 100A and includes the power supply board 52 for supplying power to the control board 51 and the control board 51. Similarly to the first embodiment, the housing 125 (first casing) and the cover 126 (second casing) form the first space A1 and the second space A2 isolated from the first space A1 in a state where the housing 125 (and the cover 126 are connected to each other, and the light emitting element 41 is disposed in the first space A1, and the drive unit 30 (specifically, second drive unit 32 and third drive unit 33) is disposed in the second space A2 (see FIGS. 11, 13, and 14).

With such a robot system 1000 as well, since the light emitting element 41 is disposed also in the first space A1 isolated from the second space A2 in which the second drive unit 32 and the third drive unit 33 are disposed by such a robot system 1000, it is possible to reduce leakage of the light LL emitted from the light emitting element 41 into the robot main body 1 (in the arm 12), as compared with the case where the second drive unit 32, the third drive unit 33, and the light emitting element 41 are disposed in the same space. For that reason, visibility of display using the light LL emitted from the light emitting element 41 can be enhanced.

While the robot and the robot system according to the invention have been described based on the illustrated embodiments, the invention is not limited thereto and the configuration of each unit can be replaced with any configuration having the same function. Any other constituent element may be added to the invention. Further, respective embodiments may be appropriately combined.

In the embodiments described above, a single arm robot is exemplified as the robot according to the invention, but the robot is not limited to the single arm robot but may be another robot such as a dual arm robot. That is, two or more robot arms may be provided to the base.

The entire disclosure of Japanese Patent Application No. 2017-192174, filed Sep. 29, 2017, is expressly incorporated by reference herein.

What is claimed is:

1. A robot comprising:
   a robot main body that includes a base and an arm configured to include a first casing and a second casing connected to the first casing;
   a motor that drives the arm; and
   a light emitting element that emits light,
   wherein the first casing and the second casing form a first space and a second space isolated from the first space in a state of being connected to each other,
   the light emitting element is disposed in the first space,
   the motor is disposed in the second space,
   a light guide plate includes an incident surface receiving light emitted from the light emitting element provided in the first space, and
   the light guide plate is exposed to an outside of the arm.
2. The robot according to claim 1,
   wherein the first casing includes a first recess and a second recess, the first recess forms the first space and the second recess forms the second space, in a state where the first casing and the second casing are connected to each other, and a second area forming an opening of the second recess of the first casing and the second casing are connected via a first sealing member.

3. The robot according to claim 2, wherein the light guide plate is provided between a third area forming an opening of the first recess of the first casing and the second casing, the third area and the light guide plate are connected via a second sealing member, and the light emitting element is provided between the first casing and the light guide plate.

4. The robot according to claim 3, wherein the second casing and the light guide plate are in contact with each other.

5. The robot according to claim 2, wherein a hole for communicating the first recess with the second recess is provided.

6. The robot according to claim 1, wherein the light emitting element is a light emitting diode.

7. The robot according to claim 1, further comprising:

a control board that is provided in the robot main body and a power supply board that is provided in the robot main body and supplies electric power to the control board; and a drive board that that is provided in the arm and drives the motor based on a command from the control board.

8. A robot system comprising:

a robot that includes a robot main body including a base and an arm configured to include a first casing and a second casing connected to the first casing, a motor that drives the arm, and a light emitting element that emits light; and a control device that is provided separately from the robot and includes a control board and a power supply board for supplying electric power to the control board, wherein the first casing and the second casing form the first space and the second space isolated from the first space, in a state of being connected to each other, the light emitting element is disposed in the first space, the motor is disposed in the second space a light guide plate includes an incident surface receiving light emitted from the light emitting element provided in the first space, and the light guide plate is exposed to an outside of the arm.

9. The robot system according to claim 8, wherein the first casing includes a first recess and a second recess, the first recess forms the first space and the second recess forms the second space, in a state where the first casing and the second casing are connected to each other, and a second area forming an opening of the second recess of the first casing and the second casing are connected via a first sealing member.

10. The robot system according to claim 9, wherein the light guide plate is provided between a third area forming an opening of the first recess of the first casing and the second casing, the third area and the light guide plate are connected via a second sealing member, and the light emitting element is provided between the first casing and the light guide plate.

11. The robot system according to claim 10, wherein the second casing and the light guide plate are in contact with each other.

12. The robot system according to claim 9, wherein a hole for communicating the first recess with the second recess is provided.

13. The robot system according to claim 8, wherein the light emitting element is a light emitting diode.

* * * * *